(12) United States Patent
Chen et al.

(10) Patent No.: US 12,530,589 B2
(45) Date of Patent: Jan. 20, 2026

(54) METHOD AND APPARATUS FOR PREDICTING ADIABATIC EVOLUTION PATH, DEVICE, AND STORAGE MEDIUM

(71) Applicant: Tencent Technology (Shenzhen) Company Limited, Shenzhen (CN)

(72) Inventors: Yuqin Chen, Shenzhen (CN); Changyu Hsieh, Shenzhen (CN); Yu Chen, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 376 days.

(21) Appl. No.: 17/476,336

(22) Filed: Sep. 15, 2021

(65) Prior Publication Data
US 2022/0004880 A1    Jan. 6, 2022

Related U.S. Application Data

(63) Continuation of application No. PCT/CN2020/124440, filed on Oct. 28, 2020.

(30) Foreign Application Priority Data

Jan. 10, 2020 (CN) .......................... 202010027656.8

(51) Int. Cl.
*G06N 3/086* (2023.01)
*G06N 3/047* (2023.01)
(Continued)

(52) U.S. Cl.
CPC ............ *G06N 3/086* (2013.01); *G06N 3/047* (2023.01); *G06N 10/20* (2022.01); *G06N 10/60* (2022.01)

(58) Field of Classification Search
CPC ........ B82Y 10/00; G06N 10/00; G06N 10/20; G06N 3/045; G06N 3/047; G06N 3/084;
(Continued)

(56) References Cited

U.S. PATENT DOCUMENTS 7,418,283 B2    8/2008  Amin
2023/0370490 A1*  11/2023  Crabtree ............. H04L 63/1433

FOREIGN PATENT DOCUMENTS

CN        107851218 A    3/2018
CN        108694440 A    10/2018
(Continued)

OTHER PUBLICATIONS

Lin et al., "Reinforcement learning architecture for automated quantum-adiabatic-algorithm design", Dec. 27, 2018, pp. 1-7 (Year: 2018).*

(Continued)

*Primary Examiner* — Brent Johnston Hoover
(74) *Attorney, Agent, or Firm* — Morgan, Lewis & Bockius LLP

(57) ABSTRACT

This application is directed to predicting an adiabatic evolution path and relates to the field of artificial intelligence (AI). In one aspect, a computer device obtains a target Hamiltonian H1 of a quantum computing problem. The computer device also determines an initial Hamiltonian H0 and a target ground state energy E1 according to the target Hamiltonian H1. The device converts a search for an adiabatic evolution path from the initial Hamiltonian H0 to the target ground state energy E1 into a chessboard game. The device also solves an optimal chessboard path of the chessboard game using a Monte Carlo tree search (MCTS) in combination with a neural network. The device also outputs the adiabatic evolution path according to the optimal chessboard path.

17 Claims, 15 Drawing Sheets

(51) Int. Cl.
  *G06N 10/20* (2022.01)
  *G06N 10/60* (2022.01)

(58) Field of Classification Search
  CPC ............ G06N 3/086; G06N 5/01; G06N 7/01; G06N 10/60
  See application file for complete search history.

(56) References Cited

FOREIGN PATENT DOCUMENTS

| | | |
|---|---|---|
| CN | 108713206 A | 10/2018 |
| CN | 110428055 A | 11/2019 |
| EP | 2729903 B1 | 4/2020 |
| JP | 2019124990 A | 7/2019 |
| WO | WO 2019241879 A1 | 12/2019 |

OTHER PUBLICATIONS

Sato et al., "An Approach for Quantum Computing using Adiabatic Evolution Algorithm", Nov. 2003, Jpn. J. Appl. Phys. vol. 42 (2003) pp. 7169-7173. (Year: 2003).*

Farhi et al., "Quantum Supremacy through the Quantum Approximate Optimization Algorithm", Oct. 21, 2019, arXiv:1602.07674v2, pp. 1-23. (Year: 2019).*

Tencent Technology (Shenzhen) Company Limited, JP2021550058, Decision to Grant a Patent, Oct. 4, 2022, 5 pgs.

Tencent Technology, WO, PCT/CN2020/124440, Feb. 10, 2021, 4 pgs.

Tencent Technology, IPRP, PCT/CN2020/124440, Jul. 12, 2022, 5 pgs.

Extended European Search Report, EP20912840.4, Apr. 26, 2022, 11 pgs.

Jian Lin et al., "Reinforcement Learning Architecture for Automated Quantum-Adiabatic-Algorithm Design", Dec. 27, 2018, pp. 1-7, XP55911607, Retrieved from the Internet: https://arxiv.org/pdf/1812.10797v1.pdf.

Mogens Dalgaard et al., "Global Optimization of Quantum Dynamics with AlphaZero Deep Exploration", arxiv.org, Cornell University Library, Ithaca, NY 14853, Nov. 19, 2019, XP081948579, 11 pgs.

Tencent Technology, ISR, PCT/CN2020/124440, Feb. 10, 2021, 2 pgs.

Tencent Technology, Korean Office Action, KR Patent Application No. 10-2021-7028001, Jul. 9, 2024, 12 pgs.

Tencent Technology, Korean Office Action, KR Patent Application No. 10-2021-7028001, Mar. 24, 2025, 4 pgs.

* cited by examiner (a)

(b)

METHOD AND APPARATUS FOR PREDICTING ADIABATIC EVOLUTION PATH, DEVICE, AND STORAGE MEDIUM

CROSS REFERENCE TO RELATED APPLICATIONS

This application is a continuation application of PCT Patent Application No. PCT/CN2020/124440, entitled "METHOD AND APPARATUS FOR PREDICTING ADIABATIC EVOLUTION PATH, DEVICE, AND STORAGE MEDIUM" filed on Oct. 28, 2020, which claims priority to Chinese Patent Application No. 202010027656.8, filed with the State Intellectual Property Office of the People's Republic of China on Jan. 10, 2020, and entitled "METHOD AND APPARATUS FOR PREDICTING ADIABATIC EVOLUTION PATH, DEVICE, AND STORAGE MEDIUM", all of which are incorporated herein by reference in their entirety.

FIELD OF THE TECHNOLOGY

Embodiments of this application relate to the field of machine learning of artificial intelligence (AI), and in particular, to a method and apparatus for predicting an adiabatic evolution path, a device, and a storage medium.

BACKGROUND OF THE DISCLOSURE

Adiabatic quantum computing is a theoretical model for implementing a quantum computer. The adiabatic quantum computing is converting a computing problem into a physical process, and an answer to the original problem is mapped to a ground state of a target Hamiltonian.

A computing process of the adiabatic quantum computing starts from an initial Hamiltonian (H0), of which a ground state can be easily prepared, and then adiabatically evolves to a target Hamiltonian (H1). The evolution process is also referred to as an adiabatic evolution path. If a time length T of the entire adiabatic evolution process is long enough (the evolution is slow enough), a quantum state prepared by the quantum computer is always kept at a ground state of an instantaneous Hamiltonian. In the related art, Q-learning in reinforcement learning is adopted to find an optimal adiabatic evolution path.

When there are more options for actions for a system state in the adiabatic evolution path to evolve to a next system state, efficiency of Q-learning is poor and convergence tends to be unstable.

SUMMARY

Embodiments of this application provide a method and apparatus for predicting an adiabatic evolution path, a device, and a storage medium, which can improve efficiency and convergence when predicting an optimal adiabatic evolution path. The technical solutions are as follows.

According to one aspect of this application, a method for predicting an adiabatic evolution path is provided. The method includes:
  obtaining a target Hamiltonian H1 of a quantum computing problem;
  determining an initial Hamiltonian H0 and a target ground state energy E1 according to the target Hamiltonian H1;
  converting a search for an adiabatic evolution path from the initial Hamiltonian H0 to the target ground state energy E1 into a chessboard game;
  solving an optimal chessboard path of the chessboard game using a Monte Carlo tree search (MCTS) in combination with a neural network; and
  obtaining the adiabatic evolution path according to the optimal chessboard path.

According to another aspect of this application, an apparatus for predicting an adiabatic evolution path is provided. The apparatus includes:
  an obtaining module, configured to obtain a target Hamiltonian H1 of a quantum computing problem;
  a determining module, configured to determine an initial Hamiltonian H0 and a target ground state energy E1 according to the target Hamiltonian H1;
  a conversion module, configured to convert a search for an adiabatic evolution path from the initial Hamiltonian H0 to the target ground state energy E1 into a chessboard game;
  a tree search module, configured to solve an optimal chessboard path of the chessboard game by using a Monte Carlo tree search (MCTS) in combination with a neural network; and
  an output module, configured to obtain the adiabatic evolution path according to the optimal chessboard path.

According to another aspect of this application, a computer device is provided. The computer device includes a processor and a memory. The memory stores at least one instruction, at least one program, a code set or an instruction set, and the at least one instruction, the at least one program, the code set or the instruction set being loaded and executed by the processor to implement any of the methods disclosed herein.

According to another aspect of this application, a quantum computer is provided, The quantum computer performing adiabatic evolution by uses (e.g., implements) the adiabatic evolution path predicted by using the foregoing method.

According to another aspect of this application, a non-transitory computer-readable storage medium is provided. The computer-readable storage medium stores at least one instruction, at least one program, a code set or an instruction set, the at least one instruction, the at least one program, the code set or the instruction set being loaded and executed by a processor to implement any of the methods disclosed herein.

According to another aspect of this application, a computer program product is provided. The computer program product, when executed by a processor, is used for implementing any of the methods disclosed herein.

According to an aspect of this application, an embodiment of this application provides a computer program product, the computer program product including computer instructions, the computer instructions being stored in a computer-readable storage medium. A processor of a computer device reads the computer instructions from the computer-readable storage medium and executes the computer instructions to cause the computer device to perform the foregoing method for predicting an adiabatic evolution path.

The technical solutions provided in the embodiments of this application may include at least the following beneficial effects:

First, a search problem of an adiabatic evolution path is converted into a chessboard game, an optimal chessboard path of the chessboard game is solved by using an MCTS in combination with a neural network, and an optimal adiabatic evolution path can be deduced according to the optimal chessboard path. Therefore, when there are relatively many candidate actions for each state in the adiabatic evolution path, a stable and convergent adiabatic evolution path can still be solved quickly and efficiently, thereby improving adiabatic evolution efficiency of an adiabatic quantum computing system and shortening the time for preparing a target ground state.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

To describe technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
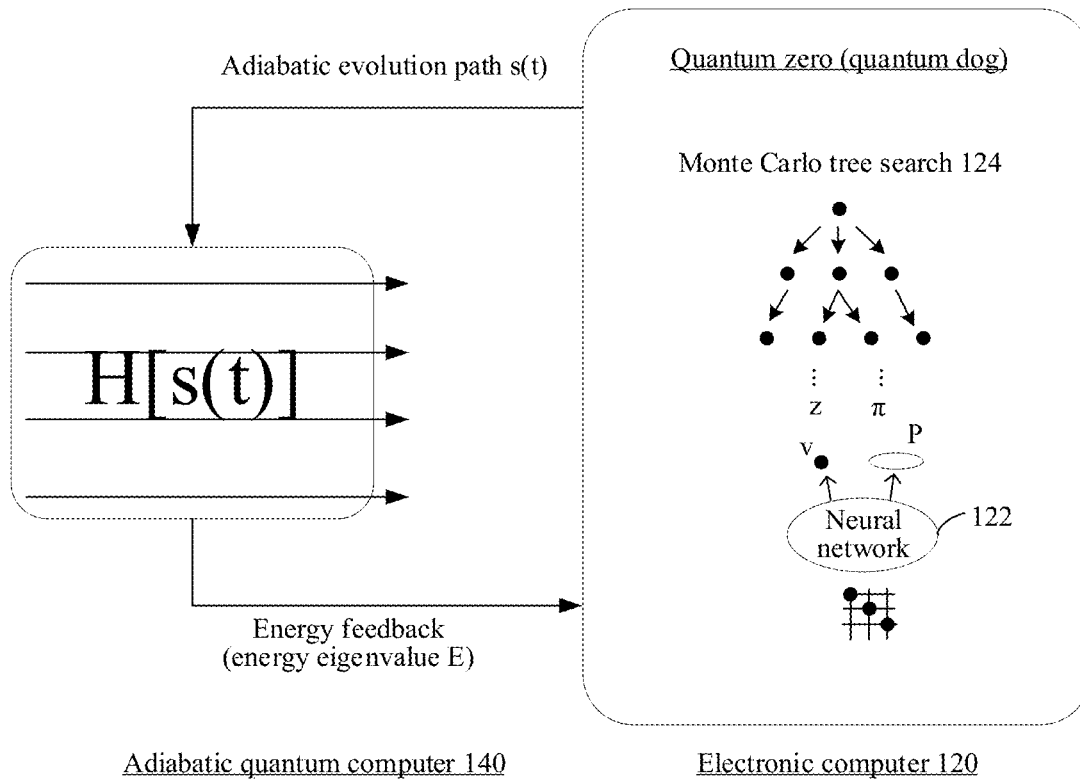
FIG. 1 is a structural block diagram of a computing system according to an embodiment of this application.

To make objectives, technical solutions, and advantages of this application clearer, the following further describes implementations of this application in detail with reference to the accompanying drawings.

First, several terms involved in this application are introduced.

1. Quantum computing: a computing mode of performing computation based on quantum logic. A basic unit of data storage is a quantum bit (qubit).

2. Qubit: a basic unit of quantum computing. A conventional computer uses 0 and 1 as basic units of binary. A difference is that: in quantum computing, 0 and 1 can be computed simultaneously, and a quantum system (system for short) may be in a linear superposition state of 0 and 1: $|\psi\rangle = \alpha|0\rangle + \beta|1\rangle$. $\alpha$ and $\beta$ represent probability amplitudes of the system on 0 and 1, and are complex numbers. Modular squares $|\alpha|^2$ and $|\beta|^2$ represent probabilities of being 0 and 1. In an example, $|\alpha|^2 + |\beta|^2 = 1$.

3. Hamiltonian: a Hermitian conjugate matrix H describing total energy of a quantum system.

4. Eigenstate: For a Hamiltonian matrix H, a solution to an equation $H|\psi\rangle = E|\psi\rangle$ is referred to as an eigenstate $|\psi\rangle$ of H, having an energy eigenvalue E.

5. Ground state: a lowest-energy eigenstate.

6. Separable state and entangled state: For a quantum system including two parts, A and B, a quantum state thereof is $|\psi\rangle \in H_A \otimes H_B$. If $|\psi\rangle$ can decomposed into a tensor product, $|\psi\rangle_A \otimes |\psi\rangle_B$, the quantum state is referred to as a separable state, and otherwise, is referred to as an entangled state.

7. Adiabatic quantum computing: a theoretical model for implementing a quantum computer, where a computing problem is converted into a physical process, and an answer to the original problem is mapped to a ground state of a target Hamiltonian. A computing process of the adiabatic quantum computing starts from an initial Hamiltonian (H0), of which a ground state can be easily prepared, and then adiabatically evolves to a target Hamiltonian (H1). If a time length T of the entire adiabatic evolution process is long enough (the evolution is slow enough), a quantum state prepared by the quantum computer is always kept at a ground state of an instantaneous Hamiltonian. A Hamiltonian in a classical adiabatic quantum computing process may be written in a combination form in which the initial Hamiltonian and the target Hamiltonian vary with time:

$$H(s(t)) = (1-s(t))H0 + s(t)H1.$$

A function of adiabatic evolution (schedule) is defined as: s(t): [0, T]→[0,1].

8. Fidelity: For two quantum pure states, $|\psi\rangle$ and, $|\phi\rangle$, fidelity is defined as a modulus square $|\langle\psi|\phi\rangle|^2$ of an inner product of the vectors.

9. Optimal adiabatic path: For a fixed T, the optimal adiabatic path is a resolution to the following optimization problem:

$$\min_{\{s(t)\}} \langle\varphi(T)|H_1|\varphi(T)\rangle, \quad (1)$$

$$\text{limited by } \frac{\partial}{\partial t}|\psi(t)\rangle = -i((1-s(t))H_0 + s(t)H_1)|\psi(t)\rangle, |\psi(0)\rangle = |g(0)\rangle \quad (2)$$

where $|g(0)\rangle$ represents a ground state of $H_0$.

10. Quantum annealing: Adiabatic evolution is a relatively ideal theoretical model of quantum computing. Because in reality, quantum hardware is interfered with by noise, or an adiabatic evolution time length T is not long enough, a quantum state prepared by a quantum computer cannot be always kept at a ground state of an instantaneous Hamiltonian as adiabatic evolution in theory. This computing mode is quantum annealing.

11. Reinforcement learning: a branch in machine learning, where an AI algorithm obtains through an interaction process with an environment how to complete task feedback and learns, from the task feedback, how to complete a task efficiently.

12. Decision policy π: a specific neural network under a reinforcement learning framework. If a given state of a system is an input state, a policy network outputs a to-be-executed action.

This application provides a reinforcement learning framework using "an MCTS in combination with a neural network" to automatically design an adiabatic evolution path, to help quantum annealing and adiabatic quantum computing to resolve the quantum computing problem efficiently. "Efficiently" herein refers to: (1) improving the fidelity of a quantum state relative to a ground state of a target Hamiltonian; and (2) reducing an energy given in quantum computing.

FIG. 1 is a schematic architectural diagram of a computing system 100 according to an exemplary embodiment of this application. The computing system 100 includes an electronic computer 120 and a quantum computer 140.

An MCTS 124 in combination with a neural network 122 is run on the electronic computer 120. For example, a reinforcement learning framework of the MCTS 124 in combination with the neural network 122 may be referred to as "quantum zero" (quantum dog for short) in this application. The MCTS 124 is configured to predict an optimal adiabatic evolution path s(t) under the guide of the neural network 122.

The electronic computer 120 is connected to the quantum computer 140.

The quantum computer 140 is configured to run the predicted adiabatic evolution path s(t) outputted by the MCTS 124 and output an energy eigenvalue E of the predicted adiabatic evolution path s(t) when the predicted adiabatic evolution path s(t) evolves to a final state, to provide the energy eigenvalue E to the electronic computer 120.

Assuming that a win condition is that: the energy eigenvalue E is less than or equal to a target ground state energy E1, when the energy eigenvalue E does not reach (e.g., correspond to) the win condition, the electronic computer 120 updates a parameter in the neural network 122 according to the energy eigenvalue E, that is, performs reinforcement learning. The electronic computer 120 obtains a neural network after the reinforcement learning, and uses the neural network after the reinforcement learning again to guide the MCTS 124 to predict the optimal adiabatic evolution path s(t).

When the energy eigenvalue E reaches (e.g., corresponds to) the win condition, the predicted adiabatic evolution path s(t) is outputted as an optimal adiabatic evolution path.

Figure 2:
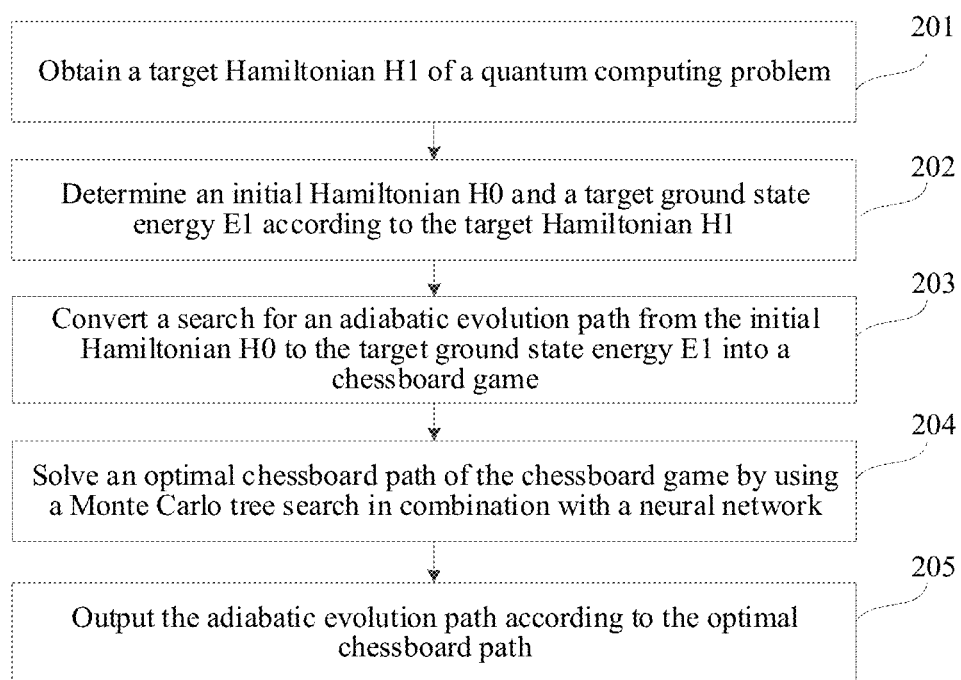
FIG. 2 is a flowchart of a method for predicting an adiabatic evolution path according to an embodiment of this application.

FIG. 2 is a flowchart of a method for predicting an adiabatic evolution path according to an exemplary embodiment of this application. In this embodiment, a description is made by using an example in which the method is applied to the electronic computer 120 shown in FIG. 1. The method includes the following steps.

Step 201. Obtain a target Hamiltonian H1 of a quantum computing problem.

For a quantum computing problem, a computing process starts from an initial Hamiltonian H0, of which a ground state is easy to prepare, and then adiabatically evolves to a target Hamiltonian H1. If a time length T of the entire adiabatic evolution process is long enough (that is, the evolution is slow enough), a quantum state prepared by the quantum computer is always kept at a ground state of an instantaneous Hamiltonian.

In some embodiments, the quantum computing problem includes at least one of the following problems: A: a to-be-simulated chemical molecular system; B: a quantum many-body physics model of a to-be-resolved ground state to; and C: a combination optimization problem converted into a quantum physics problem, for example, a combination optimization problem such as 3AT, MaxCut, or MaxQP.

A Hamiltonian during adiabatic quantum computing may be represented as a combination form in which the initial Hamiltonian H0 and the target Hamiltonian H1 vary with time:

$$H(s(t))=(1-s(t))H0+s(t)H1$$

where H0 is the initial Hamiltonian, and H1 is the target Hamiltonian. s(t) is an adiabatic evolution (schedule) function, defined as s(t): [0, T]→[0, 1]. T is a preset adiabatic evolution time length, and t is a time.

Step 202. Determine an initial Hamiltonian H0 and a target ground state energy E1 according to the target Hamiltonian H1.

The initial Hamiltonian H0 is a Hamiltonian easy to be prepared. The target ground state energy E1 is an expected energy threshold. The target ground state energy E1 is a quantum state of an expected energy (which may be understood as a lowest-energy quantum state) when the initial Hamiltonian H0 adiabatically evolves to the final state.

The initial Hamiltonian H0 and the target ground state energy E1 may be set according to the target Hamiltonian H1 of the quantum computing problem. For example, the initial Hamiltonian H0 and the target ground state energy E1 are set by a user. Alternatively, the initial Hamiltonian H0 and the target ground state energy E1 are set according to a program.

Step 203. Convert a search for an adiabatic evolution path from the initial Hamiltonian H0 to the target ground state energy E1 into a chessboard game (e.g., a chess game, a Go game, etc.).

Figure 3:
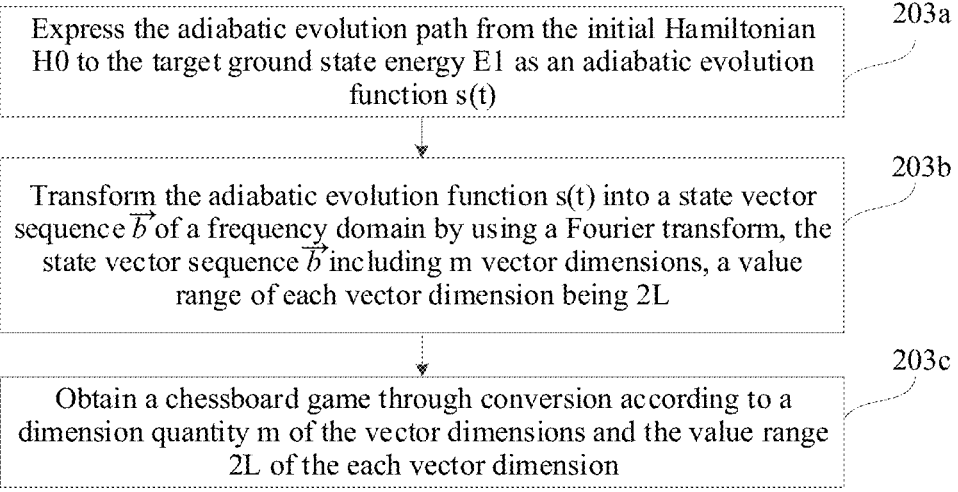
FIG. 3 is a flowchart of converting an adiabatic evolution path into a chessboard game according to an embodiment of this application.

The adiabatic evolution path (adiabatic path for short) is an evolution path from the initial Hamiltonian H0 to the target ground state energy E1. A search problem of the adiabatic evolution path may be simulated into a chessboard game from the mathematical dimension, that is, a board game or a chessboard game problem. As shown in FIG. 3, the conversion process includes at least the following steps.

203a. Express the adiabatic evolution path from the initial Hamiltonian H0 to the target ground state energy E1 as an adiabatic evolution function s(t).

The adiabatic evolution function s(t): [0, T]→[0, 1].

203b. Transform the adiabatic evolution function s(t) into a state vector sequence $\vec{b}$ of a frequency domain by using a Fourier transform, the state vector sequence $\vec{b}$ including m vector dimensions, a value range of each vector dimension being 2L.

The adiabatic evolution function s(t) is expressed in the frequency domain by using the Fourier transform, as shown in the following formula 2:

$$s(t) = \frac{t}{T} + \sum_{i=1}^{M} b_i \sin\frac{j\pi t}{T}$$

where t is a time, T is a preset adiabatic evolution time length, and $b_i$ is a state vector, i being an integer not greater than M. Therefore, the search problem of the adiabatic evolution path is converted into a search for a state vector sequence $(b_1, b_2, \ldots, b_M)$, to cause an energy of the final state, $|\psi(T)\rangle$ obtained through adiabatic evolution to be as low as possible. That is, an optimal state vector sequence $\vec{b}=(b_1, b_2, \ldots, b_M)$ needs to be searched for. A value of each $b_i$ is preset to a discrete value within a specific range, $b_j \in [-1, -1+\Delta, \ldots, 1-\Delta, 1]$.

In the above, $\Delta$ is a discretization step length, and $-1$ and $1$ are lower and upper limits of the value of bi.

203c. Obtain the chessboard game through conversion according to a dimension quantity m of the vector dimensions and the value range 2L of the vector dimension.

Figure 4:
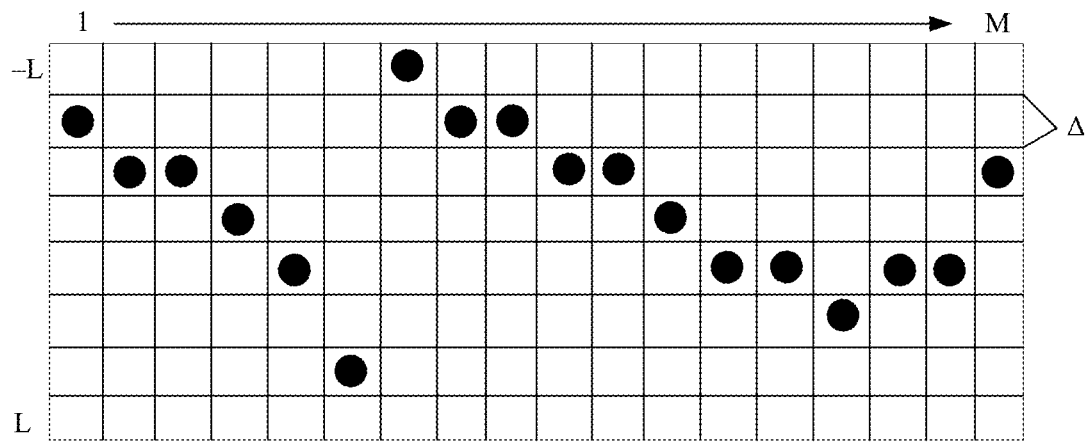
FIG. 4 is a schematic diagram of a chessboard of a chessboard game according to an embodiment of this application.

As shown in an exemplary chessboard in FIG. 4, a chessboard corresponding to the chessboard game obtained through conversion includes $2L/\Delta$ rows and m columns, each column corresponding to a move position of a chess, $\Delta$ being a discretization step length. That is, pieces are placed in sequence from the left side of the chessboard to the right side of the chessboard. There is exactly one chess (just the right quantity) in each column, and there are $2L/\Delta$ candidate move positions of the pieces in each column. A chessboard layout in which M pieces are placed directly corresponds to a specific state vector sequence $\vec{b}$. In different embodiments, $\Delta$ may be alternatively represented by using another English variable. This is not limited in this application.

Step 204. Solve an optimal chessboard path of the chessboard game by using an MCTS in combination with a neural network.

A game process of the chessboard game may be expressed as a game tree in mathematics. In this embodiment, the game tree includes m layers of nodes, each node having $2L/\Delta$ node at a lower layer, and nodes at the $i^{th}$ layer corresponding to piece move positions in the $i^{th}$ column of the chessboard. In the game tree, it is assumed that a node at an uppermost layer is a root node, and a node at a lowermost layer is a leaf node. An optimal chessboard path is a path from the root node to the leaf node on the game tree.

The MCTS is a method for making optimal decisions in AI problems, and generally, is a move planning form in a combinatorial game. The MCTS is combined with generality of stochastic simulation and accuracy of tree search, and is better applied to the game tree, for example, the AlphaZero in the chess problem also adopts the computing architecture. For example, the MCTS includes the following four stages: 1. selection, 2. expansion, 3. simulation, and 4. backpropagation. The four stages are performed a plurality of times.

The reinforcement learning framework of the MCT in combination with the neural network is a machine learning framework assisting the MCTS by using the neural network. For example, the neural network assists the selection stage and the simulation stage in the MCTS. The neural network may be a convolutional neural network, for example, a residual network ResNet adopting a residual architecture.

In an example, the neural network includes a policy network and a value network. The policy network is configured to assist a node selection in the MCTS, so as to effectively reduce a search space during a search. The value network is configured to assist a simulation stage in the MCTS, so as to improve accuracy and a speed of the simulation stage.

An optimal chessboard path of the chessboard game can be quickly solved by using the MCT in combination with the neural network.

Step 205. Obtain the adiabatic evolution path according to the optimal chessboard path.

The optimal chessboard path in the chessboard game corresponds to an optimal state vector sequence $b=(b_1, b_2, \ldots, b_M)$.

An optimal adiabatic evolution path s(t) can be obtained according to the optimal state vector sequence $\vec{b}$.

In conclusion, according to the method provided in this embodiment, first, a search problem of an adiabatic evolution path is converted into a chessboard game, an optimal chessboard path of the chessboard game is solved by using an MCTS in combination with a neural network, and an optimal adiabatic evolution path can be deduced according to the optimal chessboard path. Therefore, when there are relatively many candidate actions for each state in the adiabatic evolution path, a stable and convergent adiabatic evolution path can still be solved quickly and efficiently, thereby improving adiabatic evolution efficiency of an adiabatic quantum computing system and shortening the time for preparing a target ground state.

Reinforcement learning is a branch in machine learning. In short, the reinforcement learning is to learn how to determine how to act according to an environment state to maximize a final reward. In this application, the MCT in combination with the neural network can predict an adiabatic evolution path. An energy eigenvalue E of a quantum computer when the quantum computer evolves to a final state can be obtained by inputting the adiabatic evolution path into the quantum computer (that is, an environment) for actual operation, and the energy eigenvalue E is used as a reward for performing reinforcement learning on the neural network. Through a plurality of attempts, the MCTS finally summarizes an optimal chess layout in the chessboard game, which means that an optimal adiabatic evolution path is found.

Figure 5:
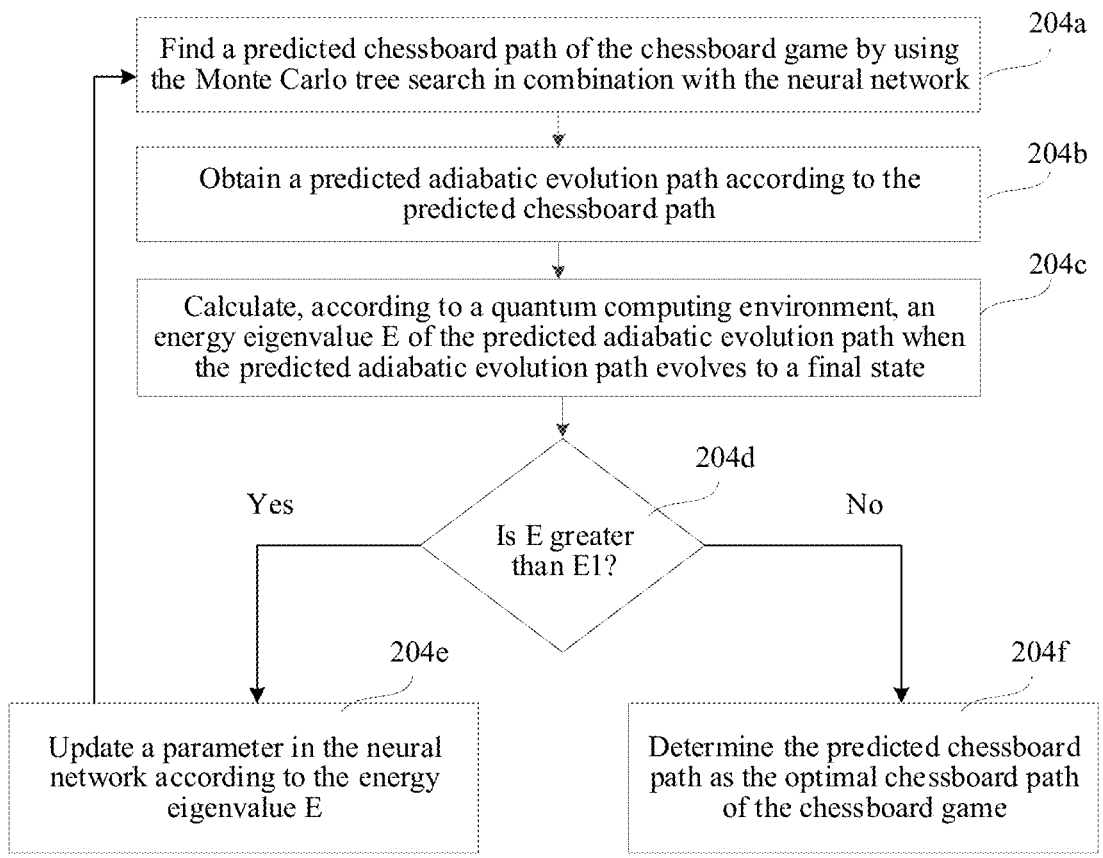
FIG. 5 is a flowchart of a method for predicting an adiabatic evolution path according to another embodiment of this application.

In some embodiments based on FIG. 2, step 204 may include at least the following steps shown in FIG. 5:

Step 204a. Find (e.g., determine, calculate, etc.) a predicted chessboard path of the chessboard game by using the MCT in combination with the neural network.

When a parameter θ in the neural network is known, the game tree corresponding to the chessboard game is searched by using the MCT in combination with the neural network, to obtain a predicted chessboard path of the chessboard game, that is, an optimal chessboard path under a current prediction capability.

Step 204b. Obtain a predicted adiabatic evolution path according to the predicted chessboard path.

The electronic computer maps the predicted chessboard path as a state vector sequence $\vec{b}$, and obtains a predicted adiabatic evolution path s(t) according to the state vector sequence $\vec{b}$.

Step 204c. Calculate, according to a quantum computing environment, an energy eigenvalue E of the predicted adiabatic evolution path when the predicted adiabatic evolution path evolves to a final state.

The electronic computer transmits the predicted adiabatic evolution path s(t) to the quantum computer, and the quantum computer adiabatically evolves to a final state according to the predicted adiabatic evolution path s(t), and measures a quantum state and a corresponding energy eigenvalue E after evolving to the final state.

In an alternative implementation, under a fixed adiabatic evolution time length T, the electronic computer solves the quantum Schrodinger equation according to the predicted adiabatic evolution path s(t), and obtains, according to a result of the solution, the quantum state and the corresponding energy eigenvalue E after evolving to the final state.

Step 204d. Determine whether the energy eigenvalue E is greater than the target ground state energy E1.

In an example, the win condition is that a difference between the energy eigenvalue E and the target ground state energy E1 is less than a threshold (e.g., a predefined threshold, a predetermined threshold, etc.). When the threshold is 0, the win condition is that the energy eigenvalue E is less than or equal to the target ground state energy E1. In this embodiment, an example in which the win condition is that the energy eigenvalue E is less than or equal to the target ground state energy E1 is used for description.

In response to a determination that the energy eigenvalue E is greater than the target ground state energy E1, a determining result is that the win condition is not satisfied, and step 204e is performed. In response to a determination that the energy eigenvalue E is less than or equal to the target ground state energy E1, a determining result is that the win condition is satisfied, and step 204f is performed.

Step 204e. Update a parameter in the neural network according to a current prediction process, and repeat step 204a after the updating.

When the energy eigenvalue E is greater than the target ground state energy E1, indicating that an optimal adiabatic evolution path is not found, a reward value z=−1 for not winning is determined according to a current prediction process. The parameter θ in the neural network is updated according to the reward value z=−1 (and a predicted chessboard path b and an action policy probability π currently outputted by the MCTS) to obtain a parameter with better performance. After the parameter θ of the neural network is updated, step 204a to step 204d are repeated.

Step 204f Determine the predicted chessboard path as the optimal chessboard path of the chessboard game.

When the energy eigenvalue E is less than or equal to the target ground state energy E1, indicating that the optimal adiabatic evolution path has been found, the electronic computer determines the predicted chessboard path currently outputted by the MCTS as the optimal chessboard path of the chessboard game.

The "optimal chessboard path" in this application is a relatively optimal chessboard path when the win condition is met rather than an optimal chessboard path in theory. That is, the "optimal" in this application is not to be understood as a narrow theoretical limit.

In conclusion, according to the method provided in this embodiment, after an optimal predicted chessboard path is predicted by using an AI algorithm (e.g., MCTS+neural network) under a current capability, an energy eigenvalue E fed back by a quantum computing environment is used as a reward, and when the energy eigenvalue E does not satisfy a win condition, a parameter in the neural network is updated according to the reward to obtain a better neural network. After a plurality of training or updating processes, the AI algorithm can output an optimal chessboard path satisfying the win condition.

To help understand an operation process of "MCTS+neural network", the following is explained according to the following procedure:

1. Game tree
2. Monte Carlo simulation
3. Basic MCTS
4. MCTS in combination with a neural network 1. Game Tree A game tree is a data structure in a tree form, and each node on the tree represents a determining state of the game. Conversion from one node to a child node of the node is referred to as an action. A quantity of child nodes of a node is referred to as a branching factor. A root node of the game tree represents an initial state of the game. A leaf node of the game tree is a node without a child node, and indicates that the game cannot continue. A state of the leaf node may be evaluated, and a result (win or loss) of this round of game may be summarized.

Figure 6:
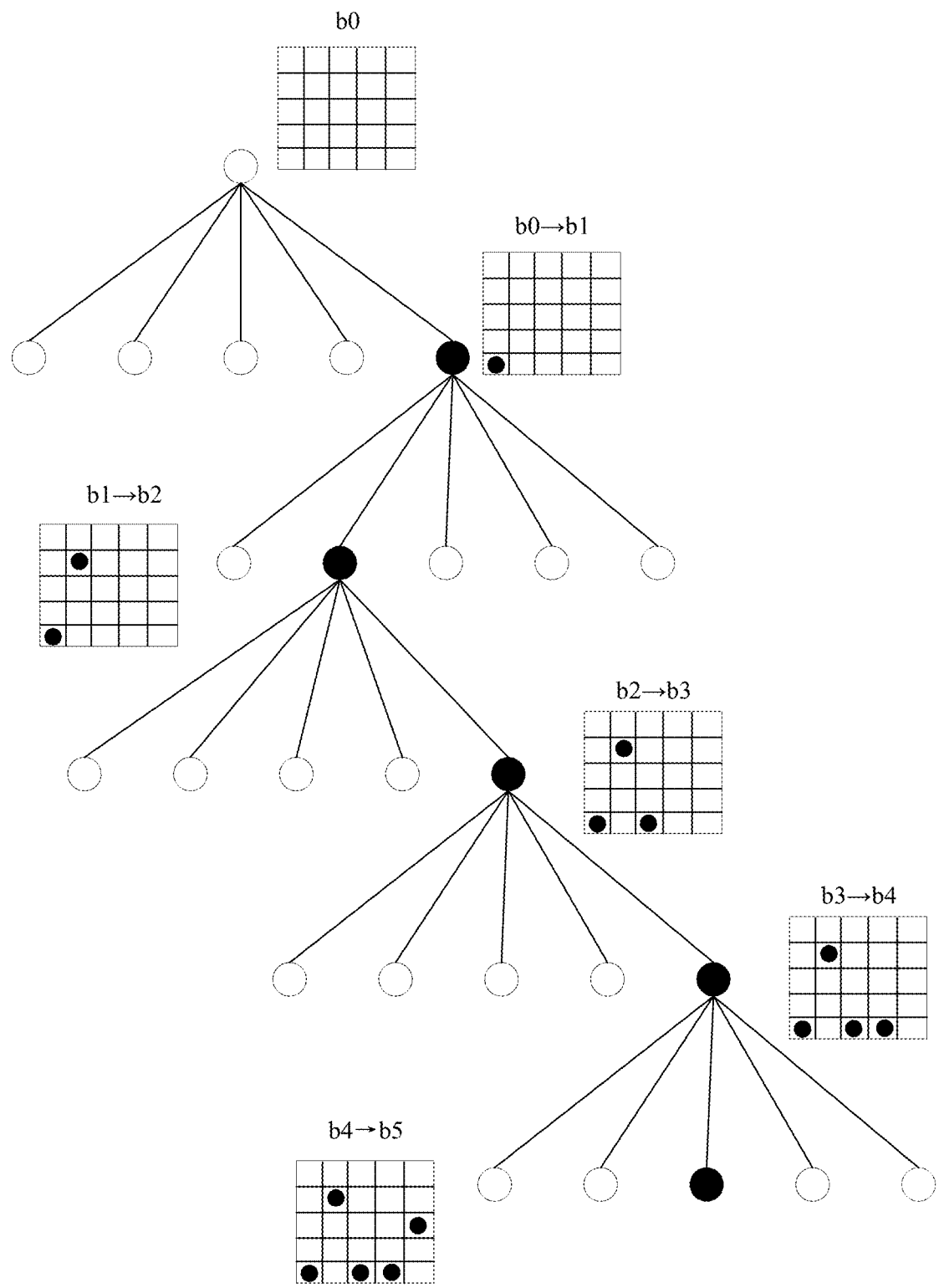
FIG. 6 is a schematic diagram of a game tree corresponding to a chessboard game according to an embodiment of this application.

With reference to FIG. 4, the game tree corresponding to the chessboard game in this application includes m+1 layers of nodes, a root node is a node at the $0^{th}$ layer, a node at the $i^{th}$ layer corresponds to a move position of the $i^{th}$ state, a branching factor of a node at each layer is 2L/Δ, that is, a quantity of layers of the game tree is equal to a quantity m+1 of columns of the chessboard, and a quantity of branches of a node at each layer is equal to a quantity of rows of the chessboard. FIG. 6 schematically shows an example of a game tree in which m=5, and 2L/Δ2=5. In an initial state, a root node corresponds to a chessboard layout of an empty chessboard. Five nodes from left to right in nodes at the first layer correspond to five candidate move positions from top to bottom in the first column in the chessboard. Nodes at the second layer are expanded after the fifth candidate move position in a b1 state. Five nodes from left to right in nodes at the second layer correspond to five candidate move positions in the second column in the chessboard from top to bottom. Nodes at the third layer are expanded after the second candidate move position in a b2 state. Five nodes from left to right in nodes at the third layer correspond to five candidate move positions in the third column in the chessboard from top to bottom. Nodes at the fourth layer are expanded after the fifth candidate move position in a b3 state. Five nodes from left to right in nodes at the fourth layer correspond to five candidate move positions in the fourth column in the chessboard from top to bottom. Nodes at the fifth layer are expanded after the fifth candidate move position in a b4 state. Five nodes from left to right in nodes at the fifth layer correspond to five candidate move positions in the fifth column in the chessboard from top to bottom. The current game ends after the third candidate move position in a b5 state.

A tree traversal (path) from the root node to the third leaf node at the fifth layer represents a single-player game process. After the single-player game is finished, the third node at the fifth layer may be evaluated, to evaluate whether the current game satisfies the win condition.

2. Monte Carlo Simulation

The Monte Carlo simulation is a simulation method using a probability statistics theory as a guide. The Monte Carlo simulation takes its name from a casino city in Monaco. The idea of the Monte Carlo simulation is described by using a simple graphics problem. Assuming that an area of an irregular pattern on the ground is required, a ball is randomly dropped into a rectangle including the irregular pattern on the ground, each time the ball is dropped, a dropping count N is increased by 1, and if the ball falls into the irregular pattern, a win count W is increased by 1. After the ball is dropped a plurality of times, the area of the irregular pattern is equal to W/N.

That is, when an area summation method of an irregular pattern is unknown, the area of the irregular pattern is predicted by using the probability in the probability statistics.

The Monte Carlo simulation and the MCTS are two different processes, but are similar in the idea.

3. Basic MCTS

Returning to the MCTS, a main concept of the MCTS is a search, that is, a downward traversal process along a game tree. A single traversal path extends from a root node (an initial game state or a current game state) to a node not expanded completely, until the current game ends. Each node in the Monte Carlo tree represents a chessboard layout, and an attribute "W/N" on the node represents that the node has been accessed N times, and won W times. For example, an initial root node is 12/21, which means 21 simulations in total, and 12 wins. W may be regarded as a total simulation reward, and N may be regarded as a total quantity of times of access.

Figure 7:
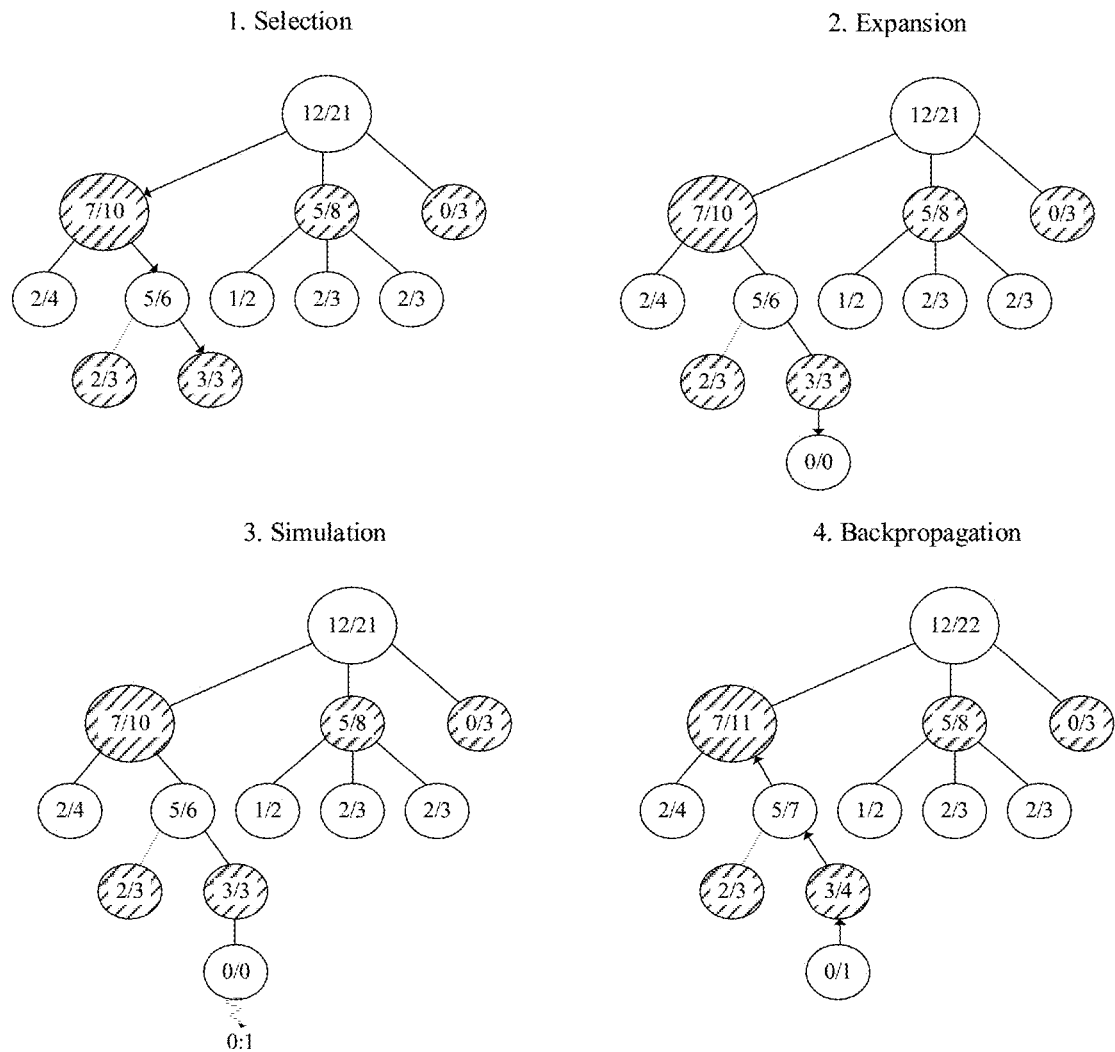
FIG. 7 is a schematic diagram of four stages of an MCTS according to an embodiment of this application.

As shown in FIG. 7, the basic MCTS includes four steps:

1. Selection

Going downward from the root node, a "most worth watching child node" is selected each time until a node $b_i$ "having unexpanded child nodes" is reached. "Having unexpanded child nodes" actually means that there are untraveled moves in the chessboard layout. How to select the "most worth watching child node" is described below.

2. Expansion

A child node (located at a layer $b_{i+1}$) with an attribute of "0/0" is added to the node $b_i$ and corresponds to the "unexpanded child node" in the foregoing step, that is, a move that has not been tried.

3. Simulation

Starting from the newly added child node in the foregoing step, moves are made using a random move policy to the last step, to obtain an outcome. According to a general opinion, the random move policy is a policy with weak chess power but quick moves.

4. Backpropagation

A simulation result (win or loss) is added to all parent nodes of the newly added child node, that is, N+1 in all the parent nodes, and W+1 in all the parent nodes if the simulation result is a win.

After the simulation is performed a plurality of times, a path formed by nodes having a largest simulation reward (or a largest quantity of times of access) is selected from nodes at each layer as an optimal chessboard path.

4. MCTS in Combination with a Neural Network

According to FIG. 6 and FIG. 7, if a depth (a quantity of layers) and a breadth (a quantity of nodes at each layer) of the game tree are relatively small, the game tree can solve a relatively accurate optimal chessboard path by exhaustively enumerating all branches. However, if the depth and the breadth of the game tree are relatively large, a search space during the foregoing computing is very huge, resulting in difficult computation.

The depth and the breadth of the search space of the game tree are reduced by using the neural network in this embodiment of this application. The following are mainly included:

(1) A policy network P is provided, which can predict, for a current node several most likely candidate move positions $a_{i+1}$ in the next move process, and a move probability $p(a_{i+1}, b_i)$ of each candidate move position $a_{i+1}$.

In this way, for the current node the MCTS only needs to search several most likely child nodes at the next layer without searching all the child nodes at the next layer, thereby reducing the search space of the game tree in breadth.

However, to make a move that the neural network cannot predict, during the selection, the MCTS not only performs prediction by relying on the move probability p (also referred to as the policy vector p) predicted by the policy network P, but also performs comprehensive selection with reference to a quantity of times of historical access of the candidate move position. That is, the MCTS preferentially selects a child node having "high move probability+low quantity of times of historical access" in the child nodes at the next layer as a target child node.

(2) A value network V is provided, which can predict a probability v that a game result of a child node $b_{i+1}$ corresponding to a candidate move position $a_{i+1}$ is a win.

In this case, for an unexpanded child node the moves to the last step according to the random move policy do not need to be simulated, and a game result v is directly predicted by the value network V, thereby reducing the search space of the game tree in depth.

According to the guide of the policy network P and the value network V in the neural network, the MCTS can find the optimal chessboard path of the game tree quickly.

Figure 8:
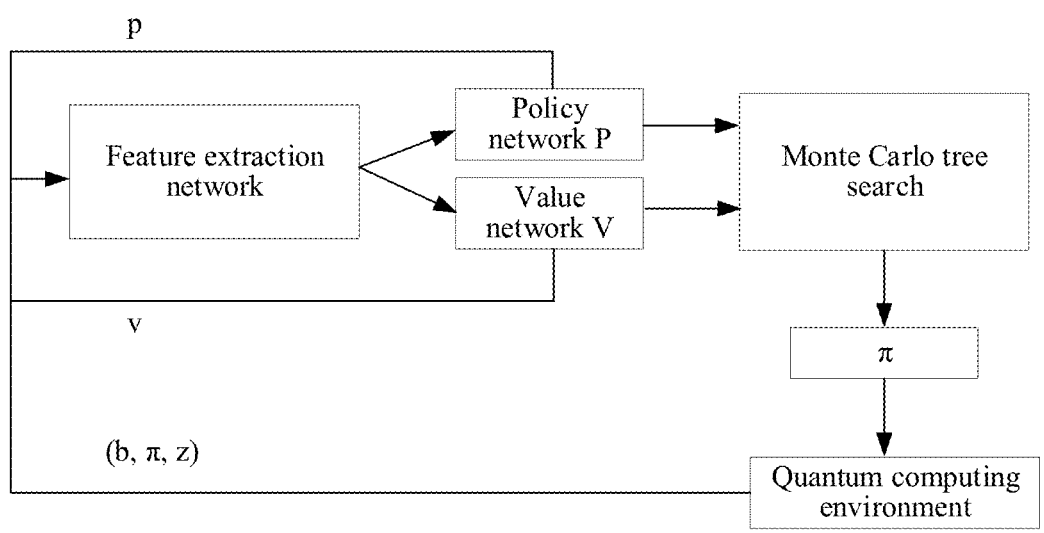
FIG. 8 is a schematic principle diagram of an MCTS and a neural network according to an embodiment of this application.

In an example shown in FIG. 8, the neural network includes a feature extraction network, a policy network P, and a value network V. In the prediction process, a current chessboard layout b (first i nodes $b_1$) is inputted into the feature extraction network for feature extraction, and extracted features are provided to the policy network P and the value network V for prediction. The policy network P is configured to predict a candidate move position and a move probability (a policy vector p for short) of a next piece, and the value network V is configured to predict a value benefit v (win possibility) of an entire chessboard layout corresponding to the next piece. The MCTS quickly finds an optimal chessboard path under a current prediction capability within a reduced search space according to the guide of the policy network P and the value network V, and outputs the path as a predicted chessboard path. In some embodiments, the predicted chessboard path is obtained through an action having the highest action probability distribution $\pi$ in each state.

The quantum computing environment (for example, a real adiabatic quantum computer) adiabatically evolves according to the predicted chessboard path to obtain an energy eigenvalue E when evolving to a final state. If the energy eigenvalue E does not satisfy a win condition, a reward value $z=-1$ corresponds to the predicted chessboard path, and a parameter $\theta$ of the neural network is updated by using $(b, \pi, z)$. b is a predicted chessboard path of this prediction, $\pi$ is an action probability distribution outputted by the MCTS, and z is a reward value for not winning. A training target is to maximize a similarity between the policy vector p and the action probability distribution $\pi$ and minimize an error between the value benefit v and a reward value z for not winning.

Figure 9:
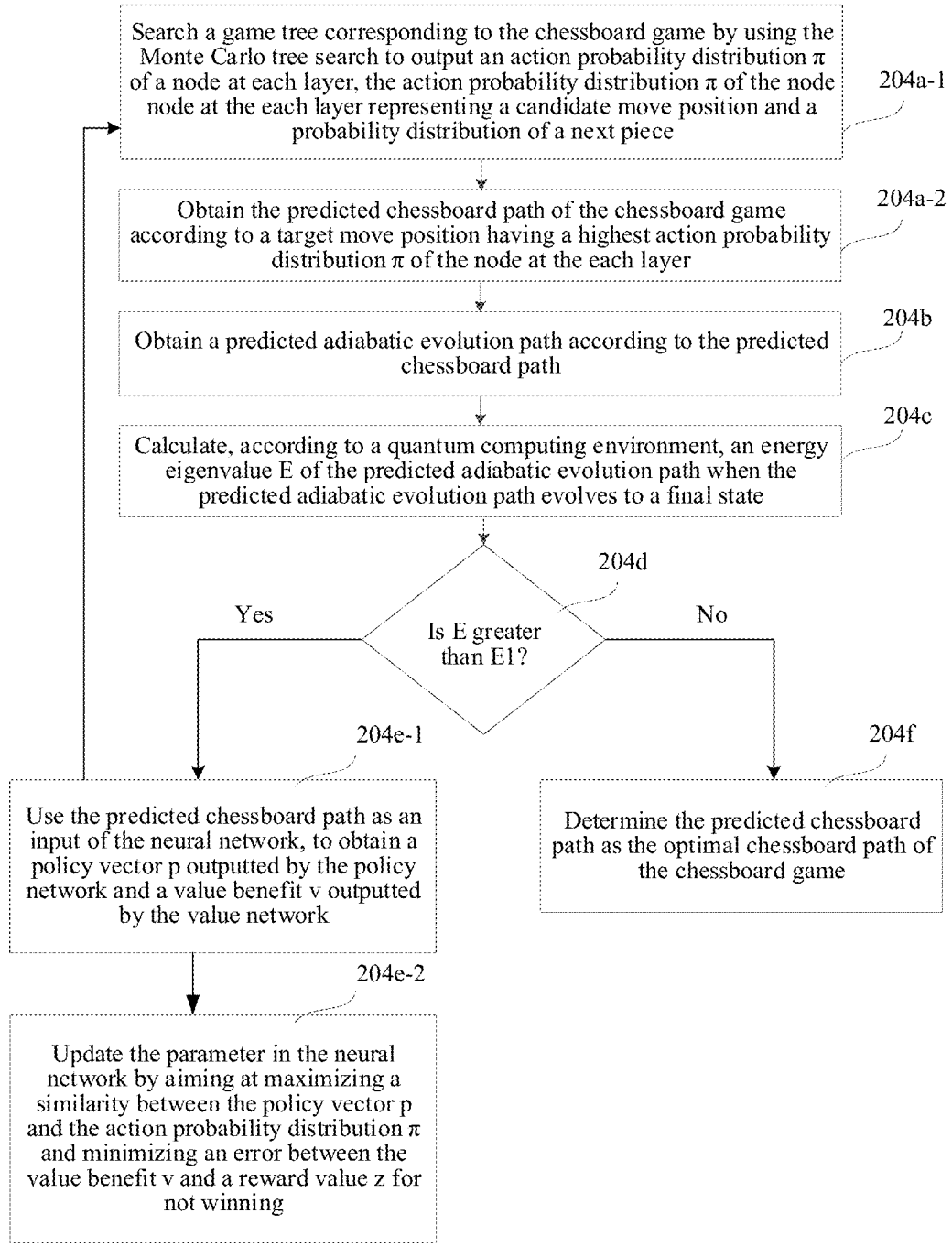
FIG. 9 is a flowchart of a method for predicting an adiabatic evolution path according to an embodiment of this application.
Figure 10:
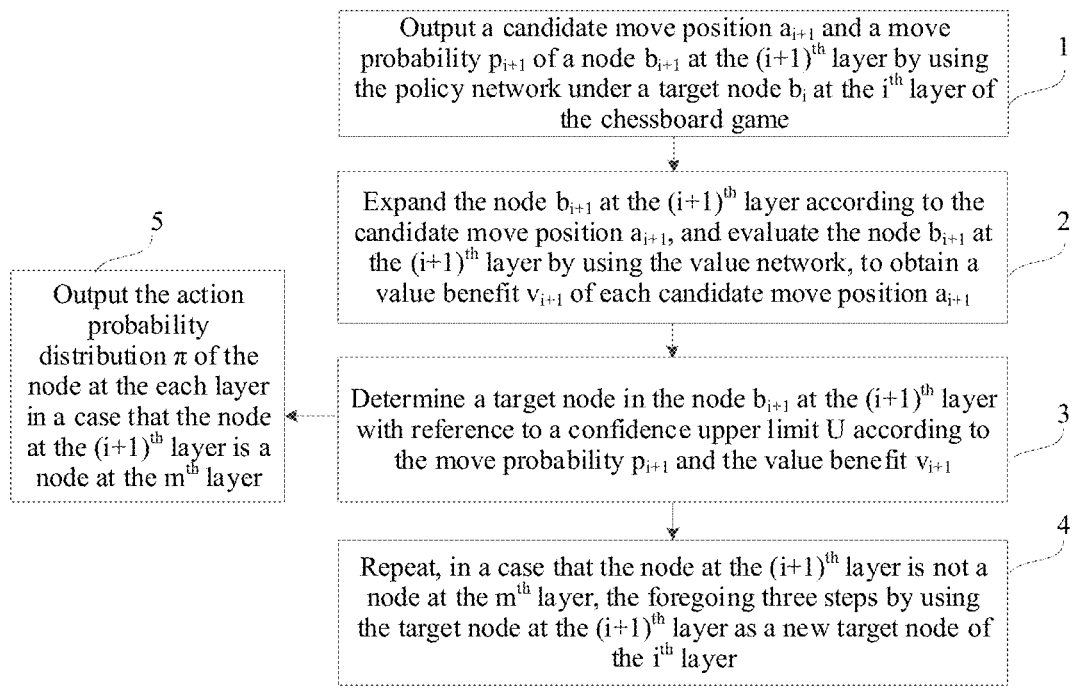
FIG. 10 is a flowchart of an MCTS during searching according to an embodiment of this application.

FIG. 9 is a flowchart of an evolution method of an adiabatic evolution path according to an exemplary embodiment of this application. In this embodiment, an example in which the method is applicable to an electronic computer or a computer device is used for description. The method includes the following steps.

Step 204a-1. Search a game tree corresponding to the chessboard game by using the MCTS to output an action probability distribution $\pi$ of a node at each layer, the action probability distribution $\pi$ of the node at the layer representing a candidate move position and a probability distribution of a next piece.

In this application, the game tree corresponding to the chessboard game has M+1 layers of nodes. Starting from a root node (or a target node in nodes at a specific layer), the MCTS is used for searching. For example, this step includes the following substeps:

S1. Output a candidate move position $a_{i+1}$ and a move probability $p_{i+1}$ of a node $b_{i+1}$ at the $(i+1)^{th}$ layer by using the policy network under a target node $b_i$ at the $i^{th}$ layer of the chessboard game.

The target node $b_i$ at the $i^{th}$ layer corresponds to a target move position of a node at the $i^{th}$ layer, i being an integer not greater than m−1. The target move position is an optimal move position predicted currently.

Because there are generally a plurality of candidate move positions $a_{i+1}$ at a next layer, and each candidate move position $a_{i+1}$ has a respective move probability $p_{i+1}$, the plurality of candidate move positions $a_{i+1}$ and the move probabilities $p_{i+1}$ may be collectively referred to as a policy vector p (or a move probability distribution).

S2. Expand the node $b_{i+1}$ at the $(i+1)^{th}$ layer according to the candidate move position $a_{i+1}$, and evaluate the node $b_{i+1}$ at the $(i+1)^{th}$ layer by using the value network, to obtain a value benefit $v_{i+1}$ of each candidate move position $a_{i+1}$.

No actual simulation needs to be performed for the expanded node $b_{i+1}$ at the $(i+1)^{th}$ layer. The value benefit $v_{i+1}$ of the node $b_{i+1}$ at the $(i+1)^{th}$ layer is directly predicted by the value network. A value benefit $v_{i+1}$ of each candidate move position $a_{i+1}$ represents a win probability under the candidate move position, that is, a game result under the candidate move position.

In some embodiments, the value benefit $v_{i+1}$ is represented by using 1 or −1, 1 representing a win, and −1 representing a loss. In other words, −1 represents that a prediction result is that an energy eigenvalue E is greater than a target ground state energy E1, and 1 represents that a prediction result is that an energy eigenvalue E is less than or equal to a target ground state energy E1.

S3. Determine a target node in the node $b_{i+1}$ at the $(i+1)^{th}$ layer with reference to a confidence upper limit U according to the move probability $p_{i+1}$ and the value benefit $v_{i+1}$.

For example, during the selection stage of the Monte Carlo tree, the selection of the target node at the $(i+1)^{th}$ layer is performed based on the idea of "exploitation-exploration trade-off", as shown in a formula 3:

$$a_{i+1} = \mathrm{argmax}_a\left(Q(b_{i+1}, a) + cP(b_{i+1}, a)\frac{\sqrt{\sum_{a'} N(B_{i+1}, a')}}{1 + N(b_{i+1}, a)}\right);$$

where $b_{i+1}$ is a current chessboard state after the selection on nodes at the $i^{th}$ layer is performed, a is a next action (that is, the $(i+1)^{th}$ move) to be performed, a value Q is an average cumulative value of value benefits $v_{i+1}$ of nodes that have been searched and that are at the $(i+1)^{th}$ layer in the current chessboard state p is a probability distribution of a move probability $p_{i+1}$ of each candidate move position in the nodes at the $(i+1)^{th}$ layer, $N(b_{i+1}, a)$ is a current quantity of historical searches of a leaf node a in the nodes at the $(i+1)^{th}$ layer, $\Sigma_a, N(b_{i+1}, a')$ is a total quantity of times of historical searches of all nodes at the $(i+1)^{th}$ layer, and a value c is a parameter used for balancing nodes that have been searched and nodes that have not been searched.

The left half part Q of the plus of the formula 3 is related to the move probability $p_{i+1}$ and the value benefit and the right half part is the confidence upper limit U, the confidence upper limit U being related to the quantity of historical searches.

S4. Repeat, when the node at the $(i+1)^{th}$ layer is not a node at the $m^{th}$ layer, the foregoing three steps by using the target node at the $(i+1)^{th}$ layer as a new target node of the $i^{th}$ layer.

S5. Output the action probability distribution $\pi$ of the node at the layer when the node at the $(i+1)^{th}$ layer is a node at the $m^{th}$ layer.

Step 204a-2. Obtain the predicted chessboard path of the chessboard game according to a target move position having a highest action probability distribution $\pi$ of the node at the layer.

Step 204b. Obtain a predicted adiabatic evolution path according to the predicted chessboard path.

Step 204c. Calculate, according to a quantum computing environment, an energy eigenvalue E of the predicted adiabatic evolution path when the predicted adiabatic evolution path evolves to a final state.

Step 204d. Determine whether the energy eigenvalue E is greater than the target ground state energy E1.

In an example, the win condition is that a difference between the energy eigenvalue E and the target ground state energy E1 is less than a threshold. When the threshold is 0, the win condition is that the energy eigenvalue E is less than or equal to the target ground state energy E1. In this embodiment, an example in which the win condition is that the energy eigenvalue E is less than or equal to the target ground state energy E1 is used for description.

In response to a determination that the energy eigenvalue E is greater than the target ground state energy E1, a determining result is that the win condition is not satisfied, and step 204e-1 is performed. In response to a determination that the energy eigenvalue E is less than or equal to the target ground state energy E1, a determining result is that the win condition is satisfied, and step 204f is performed.

Step 204e-1. Use, in response to a determination that the energy eigenvalue E does not reach (e.g., correspond to) the win condition, the predicted chessboard path as an input of the neural network, to obtain a policy vector p outputted by the policy network and a value benefit v outputted by the value network.

Step 204e-2. Update the parameter in the neural network by aiming at maximizing a similarity between the policy vector p and the action probability distribution 7E and minimizing an error between the value benefit v and a reward value z for not winning.

For example, the parameter in the neural network is adjusted according to the following loss function:

$$\mathrm{Loss} = (z-v)^2 - \pi^T \log P + c'\|\theta\|^2$$

where z is obtained by subtracting 1 from a reward value for not winning, v is a value benefit predicted by the value network, $\pi$ is an action policy probability outputted by the MCTS, p is a policy vector predicted by the policy network, c' is a coefficient for controlling a regularization item of a parameter L2, and $\theta$ is a parameter of the neural network.

Figure 11:
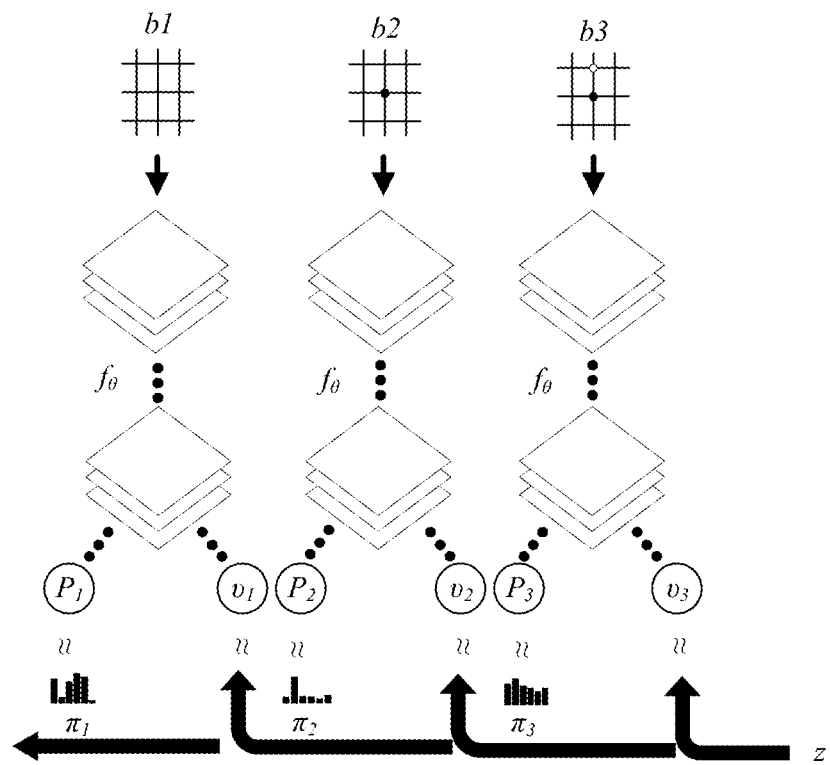
FIG. 11 is a schematic principle diagram of a neural network during training according to an embodiment of this application.

As shown in FIG. 11, in the tree search stage, for nodes b1, b2, and b3 at each layer, the neural network fθ outputs corresponding policy vectors p and evaluation values v, and the policy vector p and the evaluation value v are used for guiding the MCTS. In the training stage, for the nodes b1, b2, and b3 at each layer, action probability distributions $\pi2$, and $\pi3$ outputted by the MCTS and the reward value z for not winning are used as sample data to train the neural network fθ.

Step 204f In accordance with a determination that the energy eigenvalue E reaches the win condition, the predicted chessboard path as the optimal chessboard path of the chessboard game.

In conclusion, according to the method provided in this embodiment, through the guide of the neural network, the MCTS can quickly find an optimal predicted chessboard path within a narrowed search space, thereby improving searching efficiency.

Application Scenario:

1. The Canadian D-Wave system is rooted in adiabatic quantum computing, and evolution efficiency of such a computing system may be improved and the time for preparing a target ground state may be shortened according to an algorithm of this application. For a very unstable quantum system, a shorter preparation time means that this application can better protect the entire evolution process, maintain quantum advantages, and accelerate the development of adiabatic quantum computers.

2. A circuit design for universal quantum computing is accelerated. A major obstacle to the development of quantum computers is the short coherence time of the entire system, which, from the point of view of hardware, increases the difficulty in operation and design for scientific personnel. Scientists have proven the equivalence of adiabatic quantum computing and circuit quantum computing, and a quantum approximate optimization algorithm (QAOA) can help to convert an adiabatic path into a quantum circuit. The algorithm in this application improves efficiency of adiabatic quantum, which is equivalent to that this application may find a shorter circuit to achieve quantum computing in the conventional sense.

3. Password cracking: The adiabatic quantum computing may be used for cracking the current mainstream encryption technologies, and the algorithm in this application may also accelerate the entire process based on the original simplest linear adiabatic path, so as to improve efficiency of the password cracking greatly.

Reinforcement learning algorithms have been widely applied to the design of a task path in recent years. Especially, the AlphaZero algorithm has made major breakthroughs in games such as the Go game. It is found that, the reinforcement learning framework based on "MCTS in combination neural network" may be adjusted and improved, to help design an optimal adiabatic path s(t) and help quantum annealing and adiabatic quantum computing to resolve the computing problem more effectively.

In this application, the schedule function s(t) of the adiabatic evolution is expanded into the superposition of sine functions of different frequencies. That is, s(t) is represented in the frequency domain by using the Fourier transform:

$$s(t) = \frac{t}{T} + \sum_{j=1}^{M} b_j \sin\frac{j\pi t}{T}$$

$b_1, b_2, \ldots, b_M$ need to be found to cause an energy for evolving to the final state $|\psi(T)\rangle$ to be as low as possible.

In this application, a problem of designing an optimal adiabatic evolution path is converted into a problem of searching for an optimal state vector sequence $\vec{b}$. This application converts this permutation and combination problem into an exactly equivalent "single-player game" and modifies the Go algorithm of the AlphaZero to search for an optimal "single-player game" policy. Each time the AI algorithm designs an evolution path, the adiabatic quantum computer/quantum annealing machine (for example, serving as an environment under the reinforcement learning framework) is adopted to execute the evolution path once to verify the effect of this evolution path, for example, whether a ground state (a lowest-energy quantum state) of a target Hamiltonian can be prepared successfully. This application may use an energy measurement provided by the quantum hardware to evaluate the quality of the path designed by the AI algorithm. This application may determine whether the design AI wins this round based on customized criteria. Through continuous interaction with the quantum computer (the AI guides the evolution of the adiabatic quantum computing and obtains real-time energy measurement feedback from it), the AI algorithm based on the reinforcement learning adjusts its game policy until it reaches a satisfactory level of effectiveness.

This application is to search for an optimal state vector $\vec{b}=(b_1, b_2, \ldots, b_M)$. A value of each $b_i$ is preset to a discrete value within a specific range, $b_i \in [-1, -1+\Delta, \ldots, 1-\Delta, 1]$. Therefore, as shown in FIG. 4, a selection of a group of optimal parameters $\vec{b}$ has been converted into a selection of a move position on a chessboard with a size of $$\frac{2/M}{\Delta}.$$

A rule of the single-player game is that each column needs to have and only have one piece (just the right amount). A chessboard on which pieces have been played directly corresponds to a specific state vector $\vec{b}$, and an adiabatic evolution path is obtained through the formula (2). According to the formula (1), this application performs the design in a quantum adiabatic computer, and performs energy measurement on the quantum system when the computing is finished, to determine whether this design wins in the game. Through repeated game attempts, the AI algorithm eventually concludes best move positions for pieces on the chessboard, which means that the algorithm can find an optimal adiabatic path. In this application, this method that learns from scratch, applied to the design of a quantum adiabatic evolution path, and based on a game architecture of an MCTS in combination with a network is referred to as the quantum zero.

Figure 12:
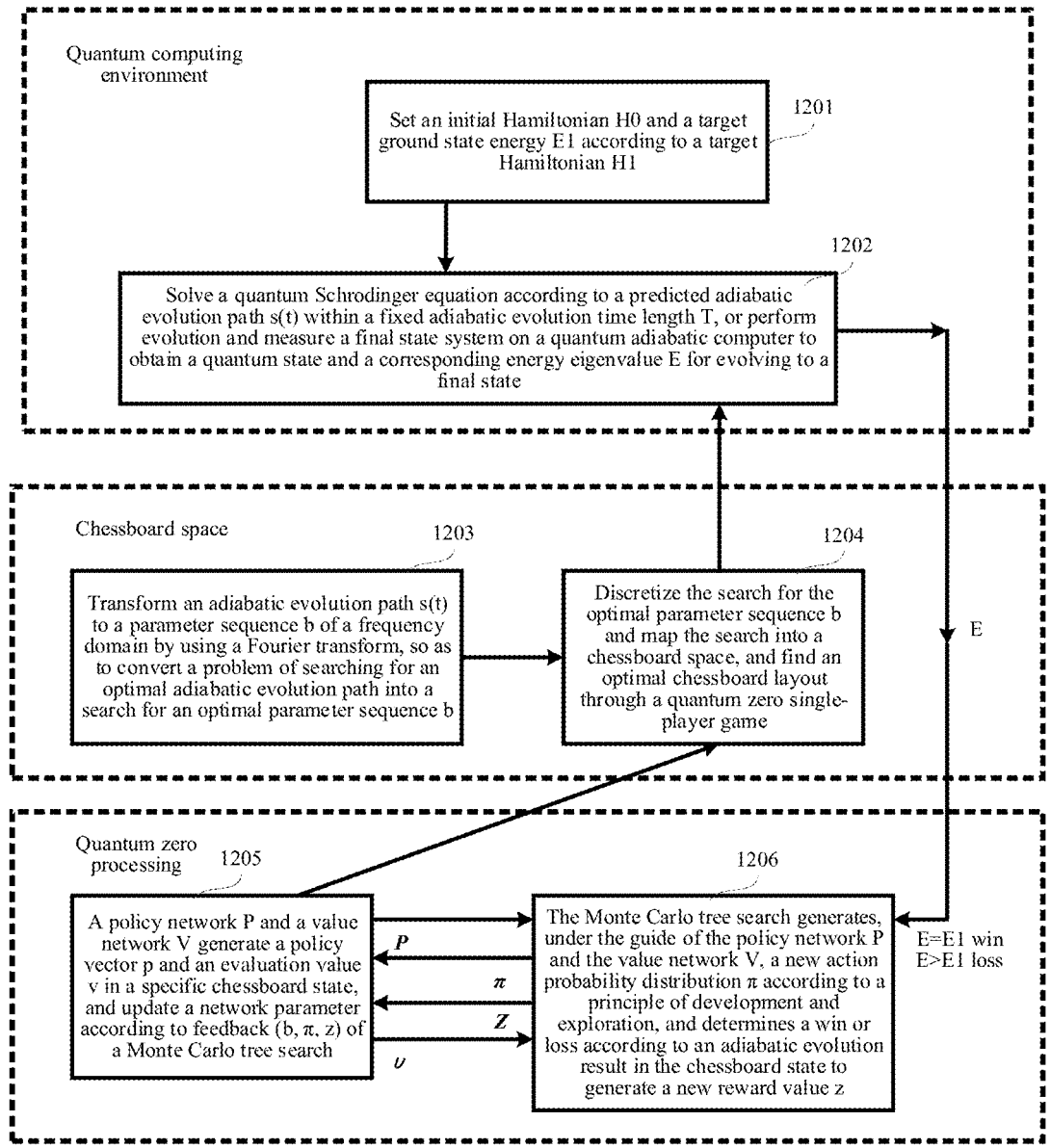
FIG. 12 is a flowchart of a method for predicting an adiabatic evolution path according to an embodiment of this application.

Referring to FIG. 12, the method for predicting an adiabatic evolution path provided in this application includes three parts: a quantum computing environment, a chessboard space, and quantum zero processing.

For the quantum computing environment:

Step 1201. Set an initial Hamiltonian H0 and a target ground state energy E1 according to a target Hamiltonian H1.

Step 1202. Solve a quantum Schrodinger equation according to a predicted adiabatic evolution path s(t) within a fixed adiabatic evolution time length T, or perform evolution and measure a final state system on a quantum adiabatic computer to obtain a quantum state and a corresponding energy eigenvalue E for evolving to a final state.

For the Chessboard Space:

Step 1203. Transform an adiabatic evolution path s(t) to a parameter sequence b of a frequency domain by using a Fourier transform, so as to convert a problem of searching for an optimal adiabatic evolution path into a search for an optimal parameter sequence b.

Step 1204. Discretize the search for the optimal parameter sequence b and map the search into a chessboard space, and find an optimal chessboard layout through a quantum zero single-player game.

For the quantum zero processing:

Step 1205. A policy network and a value network generate a policy vector p and an evaluation value v in a specific chessboard state, and update a network parameter according to feedback (b, π, z) of an MCTS.

The policy network and the value network generate a policy vector p and an evaluation value v in a specific chessboard state, and use the policy vector p and the evaluation value v to guide the MCTS. When the win condition is not satisfied, the MCTS uses the feedback (b, π, z) as a training sample to update the network parameter of the neural network (the policy network and the value network).

Step 1206. The MCTS generates, under the guide of the policy network and the value network, a new action probability distribution π according to a principle of development and exploration, and determines a win or loss according to an adiabatic evolution result in the chessboard state to generate a new value reward z.

The new AI algorithm developed in this application can improve both efficiency (a shorter operation time of obtaining a result) and accuracy (higher probability of obtaining a ground state of the target Hamiltonian) of the adiabatic quantum computing. The two points are demonstrated by using the following two cases in this application.

Case 1. Considering a classical problem of the quantum computing-Grover search: assuming that there are n bits, and the n bits may encode $2^n$ objects. In a worst case, a classical algorithm needs to try $2^n$ times. However, the quantum computer may implement secondary acceleration, that is, only $2^{n/2}$ times of computing are needed in this application. An adiabatic Grover search is to design an optimal adiabatic path for the following two given Hamiltonians H0 and H1.

$$H_0 = I - |\phi\rangle\langle\phi|, \quad H_1 = I - |m\rangle\langle m|$$

In $$|\phi\rangle = \frac{1}{2^{n/2}} \sum_{i=0}^{2^n - 1} |i\rangle,$$

I is an identity matrix, and |m⟩ is a target binary character string.

Comparing a win probability of reaching a target ground state within a time length T by using the adiabatic path designed by the quantum zero using the MCTS and the reinforcement learning with that of the conventional adiabatic path (linear search), whether the quantum zero can play an important role in designing an optimal adiabatic quantum evolution path can be clearly learned.

Case 2. The 3-SAT problem, which is often discussed in computer science, and also has a wide range of practical applications, is taken into consideration. To convert the permutation optimization and combination problem into a problem that can be handled through adiabatic quantum computing, a target Hamiltonian H1 and an initial Hamiltonian H0 need to be written in this application.

$$H_0 = \frac{1}{2}\sum_{i=1}^{n} h_i, \quad h_i = \begin{pmatrix} 1 & -1 \\ -1 & 1 \end{pmatrix}$$

-continued $$H_1 = \frac{1}{2}\sum_{\alpha=1}^{N_c} |z_1^\alpha z_2^\alpha z_3^\alpha\rangle\langle z_1^\alpha z_2^\alpha z_3^\alpha|$$

The target Hamiltonian $H_1$ includes $N_c$ logic sentences, and a limit condition of each sentence α is determined by three binary digits ($z_1^\alpha$, $z_2^\alpha$, $z_3^\alpha$). A solution to this problem is to find an n-bit value that can satisfy all of the $N_c$ logic sentences. In this application, a class of 3-SAT problems that challenge the adiabatic evolution are particularly selected: a target Hamiltonian has only one ground state and a plurality of first excited states. In the process of adiabatic evolution, the system is likely to be trapped in a local optimal solution, which makes the efficiency of adiabatic evolution too low. Comparing a win probability of reaching a target ground state within a time length T by using the adiabatic path designed by the quantum zero using the MCTS and the reinforcement learning with that of the conventional adiabatic path (linear search), whether the quantum zero can play an important role in designing an optimal adiabatic quantum evolution path can be clearly learned.

Figure 13:
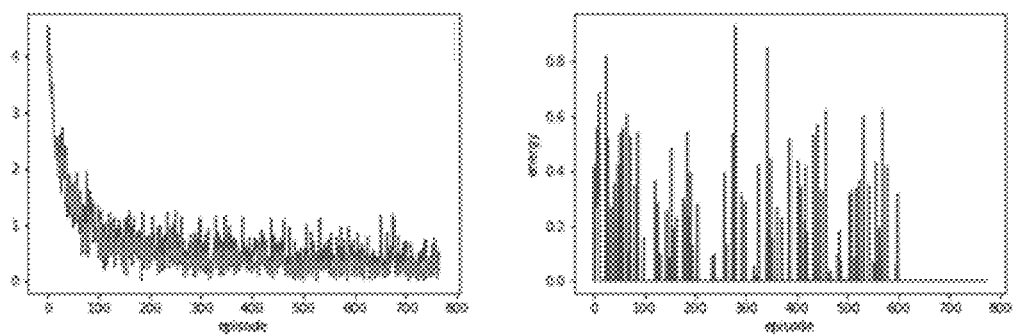
FIG. 13 to FIG. 17 are comparison diagrams of effects of an adiabatic evolution path predicted in this application and a conventional adiabatic evolution path.

FIG. 13 is a result of an adiabatic quantum evolution path of a 4-qubit Grover search designed by the quantum zero within an evolution time length T=45. In the left figure of FIG. 13, a wavy line located at a lower part represents that an entropy outputted by the policy network P varies with a quantity of rounds of the quantum zero game. A wavy line located at an upper part represents that a loss function outputted by the policy network P and the value network V varies with a quantity of rounds of the quantum zero game. The right figure of FIG. 13 shows an energy of a final state of evolution in an evolution path designed by the quantum zero. It may be seen that, when the quantum zero gradually completes the training, an optimal path within a specified evolution time is found, to obtain a target Hamiltonian ground state.

Figure 14:
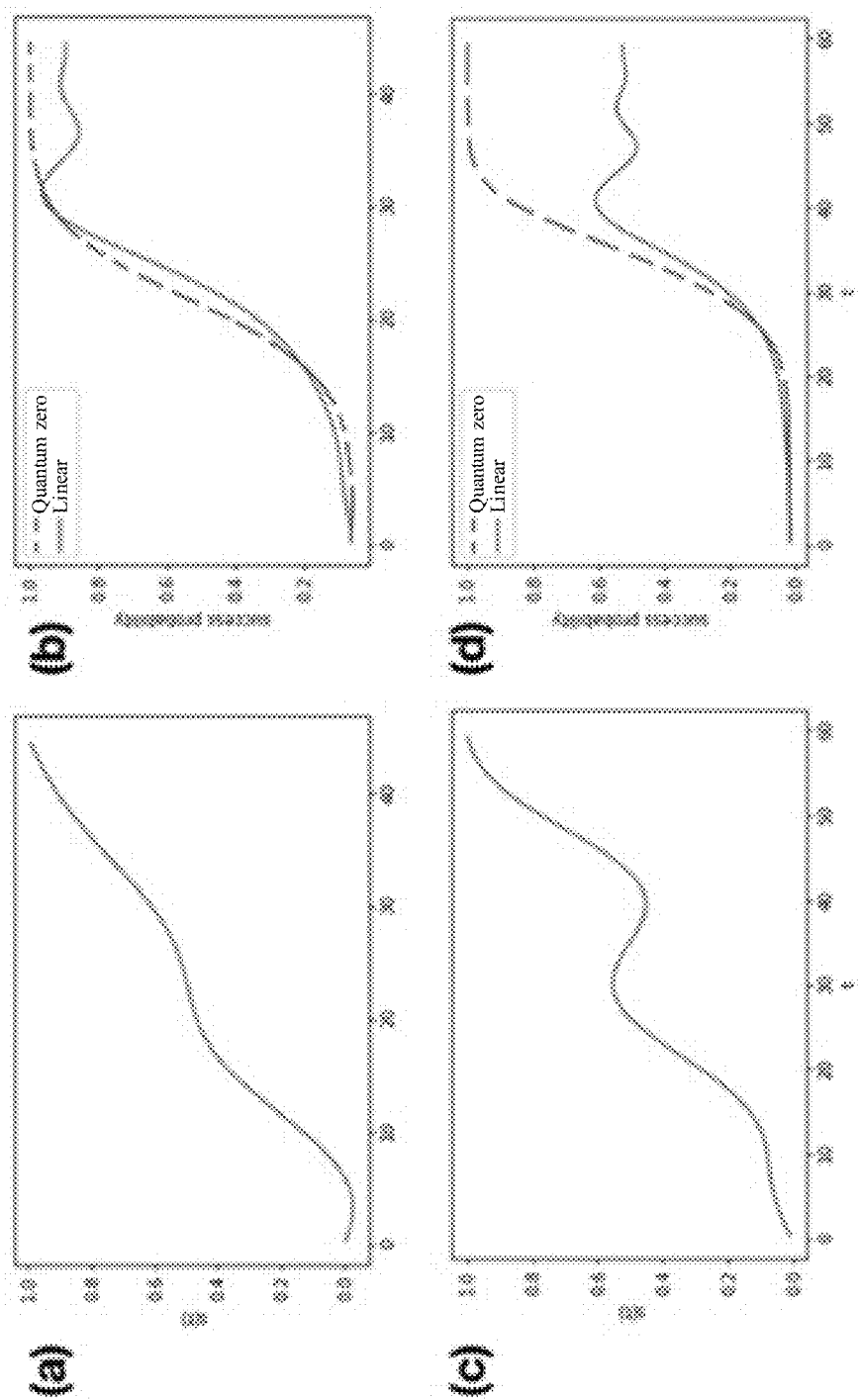

The cases of the Grover search shown in FIG. 13 are continuously used. In this application, the adiabatic evolution path designed by the quantum zero is discussed below more profoundly and is compared with the most conventional linear path. A part (a) in FIG. 14 is an adiabatic evolution path s(t) designed by the quantum zero for a 4-qubit Grover search within an evolution time length T=45. A dotted line in a part (b) in FIG. 14 is a probability that the target Hamiltonian ground state is prepared successfully by evolving, along with an adiabatic evolution time length t~(0, T), according to a path designed by the quantum zero. A solid line is a probability that the target Hamiltonian ground state is prepared successfully by evolving according to a linear path along with an adiabatic evolution time length t~(0, T). A part (c) in FIG. 14 is an adiabatic quantum evolution path s(t) designed by the quantum zero for a 6-qubit Grover search within an evolution time length T=60. A dotted line in a part (d) in FIG. 14 is a probability that the target Hamiltonian ground state is prepared successfully by evolving, along with an adiabatic evolution time length t~(0, T), according to a path designed by the quantum zero. A solid line is a probability that the target Hamiltonian ground state is prepared successfully by evolving according to a linear path along with an adiabatic evolution time length t~(0, T). Obviously, the path designed by the quantum zero can ensure a high success rate. However, along with the increase of a quantity of bits, obviously, a target Hamiltonian ground state cannot be prepared according to the conventional linear path within a required time range T.

Figure 15:
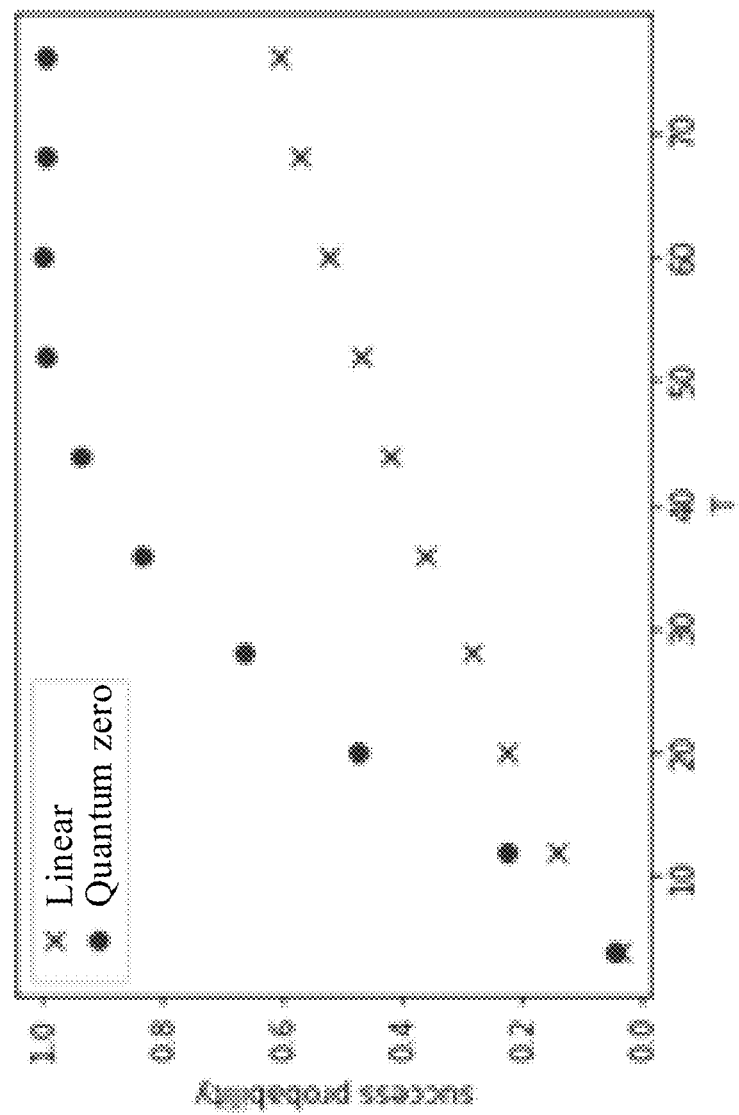

FIG. 15 shows probabilities that the target Hamiltonian ground state is prepared successfully when a 6-qubit Grover search is considered for different evolution time lengths. A dot is a probability that the target Hamiltonian ground state is prepared successfully according to an evolution path designed by the quantum zero. A cross point is a probability that the target Hamiltonian ground state is prepared successfully according to a linear evolution path. Obviously, the evolution path designed by the quantum zero greatly improves the probability of successfully preparing the target Hamiltonian ground state through quantum adiabatic evolution.

For the case 2 mentioned in the foregoing, the quantum zero is applied to the design of an adiabatic evolution path in the 3-SAT problem. This application researches a class of 3-SAT problems that challenge the adiabatic evolution: a target Hamiltonian has only one ground state and a plurality of first excited states. In the process of adiabatic evolution, the system is likely to be trapped in a local optimal solution, which makes the efficiency of adiabatic evolution too low. This application uses a 3-SAT problem including 7 qubits and 21 clauses satisfying the foregoing condition and a 3-SAT problem including 11 qubits and 33 clauses satisfying the foregoing condition as an example, which indicates that along with gradual training of the quantum zero, an optimal path within a specified evolution time length can be stably found. Compared with the conventional adiabatic path (linear search), the success rate of reaching the target ground state within the time length T by using the adiabatic path designed by the quantum zero is obviously higher.

Figure 16:
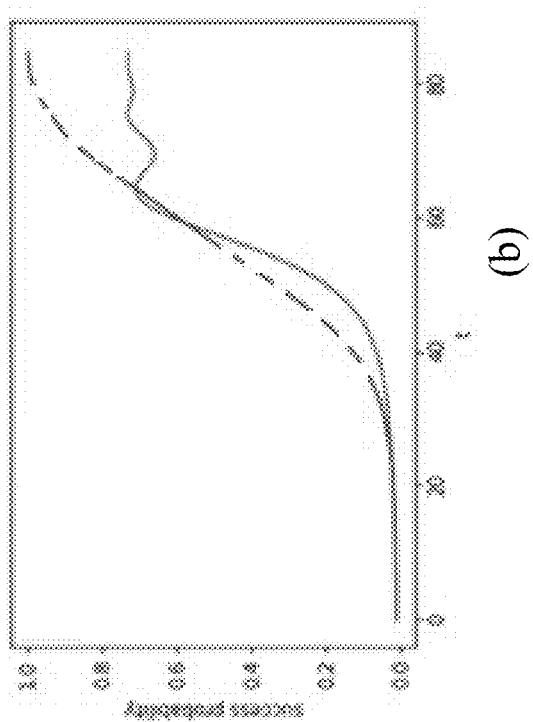
Figure 16:
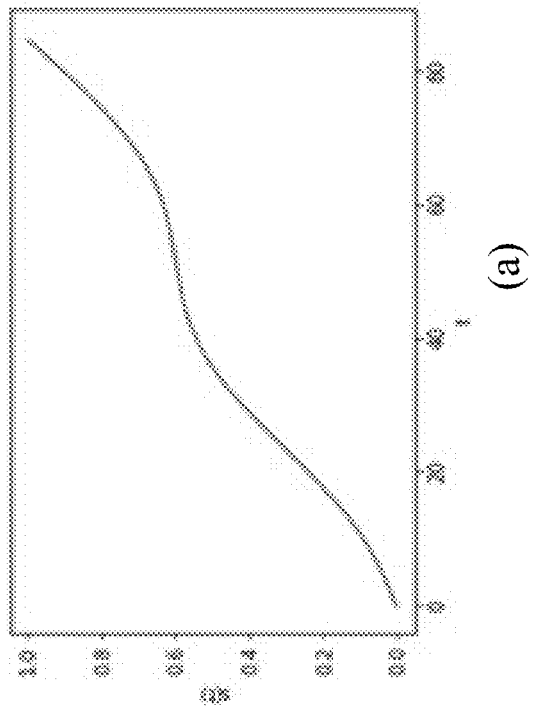

A part (a) in FIG. 16 is an adiabatic quantum evolution path s(t) designed by the quantum zero for a 7-qubit 3-sat problem within an evolution time length T=85. A dotted line in a part (b) in FIG. 16 is a probability that the target Hamiltonian ground state is prepared successfully by evolving, along with an adiabatic evolution time length t~(0, T), according to a path designed by the quantum zero. A solid line is a probability that the target Hamiltonian ground state is prepared successfully by evolving according to a linear path along with an adiabatic evolution time length t~(0, T). Obviously, the path designed by the quantum zero has better effects.

Figure 17:
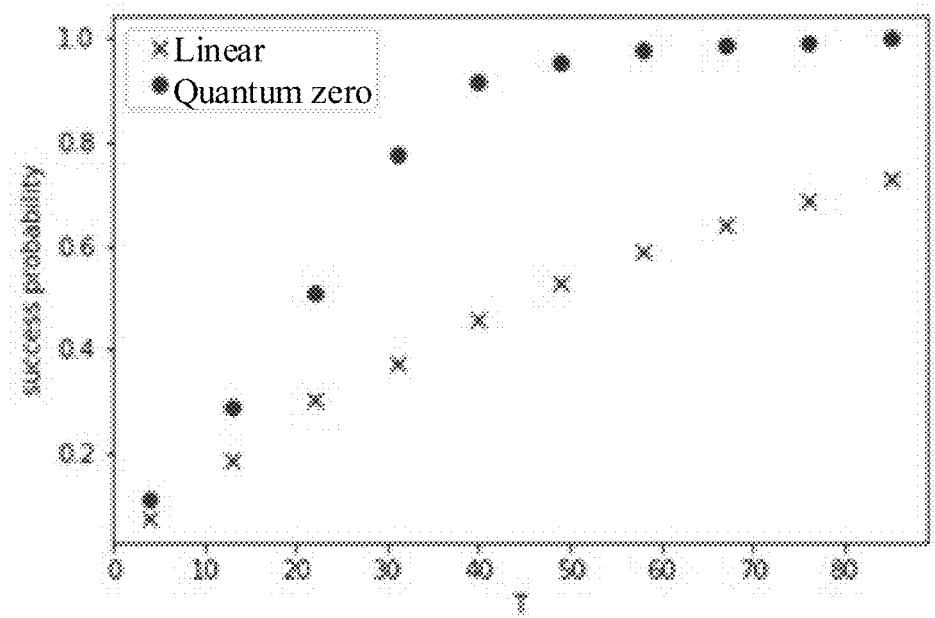
Figure 17:
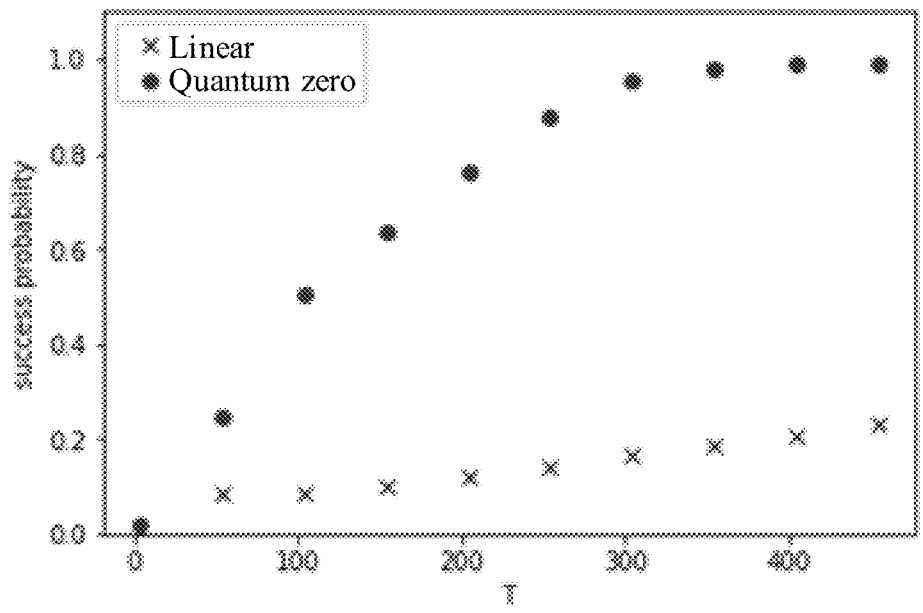

A figure (a) and a figure (b) in FIG. 17 respectively show probabilities that the target Hamiltonian ground state is prepared successfully when a 7-qubit 3-sat problem and a 11-qubit 3-sat problem are considered for different evolution time lengths. A dot is a probability that the target Hamiltonian ground state is prepared successfully according to an evolution path designed by the quantum zero. A cross point is a probability that the target Hamiltonian ground state is prepared successfully according to a linear evolution path. Obviously, the evolution path designed by the quantum zero greatly improves the probability of successfully preparing the target Hamiltonian ground state through quantum adiabatic evolution.

Figure 18:
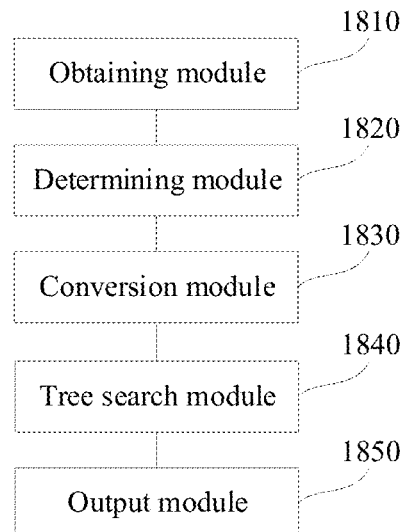
FIG. 18 is a block diagram of an apparatus for predicting an adiabatic evolution path according to an embodiment of this application.

FIG. 18 is a block diagram of an apparatus for predicting an adiabatic evolution path according to an exemplary embodiment of this application. The apparatus may be implemented as all or part of an electronic computer, or may be applied to the electronic computer. The apparatus includes:
- an obtaining module 1810, configured to obtain a target Hamiltonian H1 of a quantum computing problem;
- a determining module 1820, configured to determine an initial Hamiltonian H0 and a target ground state energy E1 according to the target Hamiltonian H1;
- a conversion module 1830, configured to convert a search for an adiabatic evolution path from the initial Hamiltonian H0 to the target ground state energy E1 into a chessboard game;
- a tree search module 1840, configured to solve an optimal chessboard path of the chessboard game by using an MCTS in combination with a neural network; and
- an output module 1850, configured to obtain the adiabatic evolution path according to the optimal chessboard path.

In some embodiments, the tree search module 1840 is configured to find a predicted chessboard path of the chessboard game by using the MCT in combination with the neural network; obtain a predicted adiabatic evolution path according to the predicted chessboard path; calculate, according to a quantum computing environment, an energy eigenvalue E of the predicted adiabatic evolution path when the predicted adiabatic evolution path evolves to a final state; in accordance with a determination that the energy eigenvalue E does not reach a win condition, update a parameter in the neural network according to a current prediction process, and repeat the operation of finding a predicted chessboard path of the chessboard game by using the MCT in combination with the neural network after the updating; and in accordance with a determination that the energy eigenvalue E reaches (e.g., corresponds to) the win condition, use the predicted chessboard path as the optimal chessboard path of the chessboard game.

The win condition includes that a difference between the energy eigenvalue E and the target ground state energy E1 is less than a threshold.

In some embodiments, the neural network includes a policy network and a value network.

The tree search module 1840 is configured to search a game tree corresponding to the chessboard game by using the MCTS to output an action probability distribution $\pi$ of a node at each layer, the action probability distribution $\pi$ of the node at the layer representing a candidate move position and a probability distribution of a next piece; and obtain the predicted chessboard path of the chessboard game according to a target move position having a highest action probability distribution $\pi$ of the node at the layer.

The tree search module 1840 is further configured to use, in response to a determination that the energy eigenvalue E does not reach the win condition, the predicted chessboard path as an input of the neural network, to obtain a policy vector p outputted by the policy network and a value benefit v outputted by the value network; and update the parameter in the neural network by aiming at maximizing a similarity between the policy vector p and the action probability distribution $\pi$ and minimizing an error between the value benefit v and a reward value z for not winning.

In some embodiments, the tree search module 1840 is configured to output a candidate move position $a_{i+1}$ and a move probability $p_{i+1}$ of a node $b_{i+1}$ at the $(i+1)^{th}$ layer by using the policy network under a target node $b_i$ at the $i^{th}$ layer of the chessboard game, the target node $b_i$ at the $i^{th}$ layer corresponding to a target move position of a node at the $i^{th}$ layer, i being an integer not greater than m−1; expand the node $b_{i+1}$ at the $(i+1)^{th}$ layer according to the candidate move position $a_{i+1}$, and evaluate the node $b_{i+1}$ at the $(i+1)^{th}$ layer by using the value network, to obtain a value benefit $v_{i+1}$ of each candidate move position $a_{i+1}$; determine a target node in the node $b_{i+1}$ at the $(i+1)^{th}$ layer with reference to a confidence upper limit U according to the move probability $p_{i+1}$ and the value benefit $v_{i+1}$; repeat, when the node at the $(i+1)^{th}$ layer is not a node at the $m^{th}$ layer, the foregoing three operations by using the target node at the $(i+1)^{th}$ layer as a new target node of the $i^{th}$ layer; and output the action probability distribution π of the node at the layer when the node at the $(i+1)^{th}$ layer is a node at the $m^{th}$ layer.

In some embodiments, the confidence upper limit is related to a quantity of times of historical searches of the candidate move position.

In some embodiments, the conversion module 1830 is configured to express the adiabatic evolution path from the initial Hamiltonian H0 to the target ground state energy E1 as an adiabatic evolution function s(t); transform the adiabatic evolution function s(t) into a state vector sequence b of a frequency domain by using a Fourier transform, the state vector sequence b including m vector dimensions, a value range of each vector dimension being 2L; and obtain the chessboard game through conversion according to a dimension quantity m of the vector dimensions and the value range 2L of the vector dimension, a chessboard corresponding to the chessboard game including 2L/Δ rows and m columns, each column corresponding to a move position of a chess, Δ being a discretization step length.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 19:
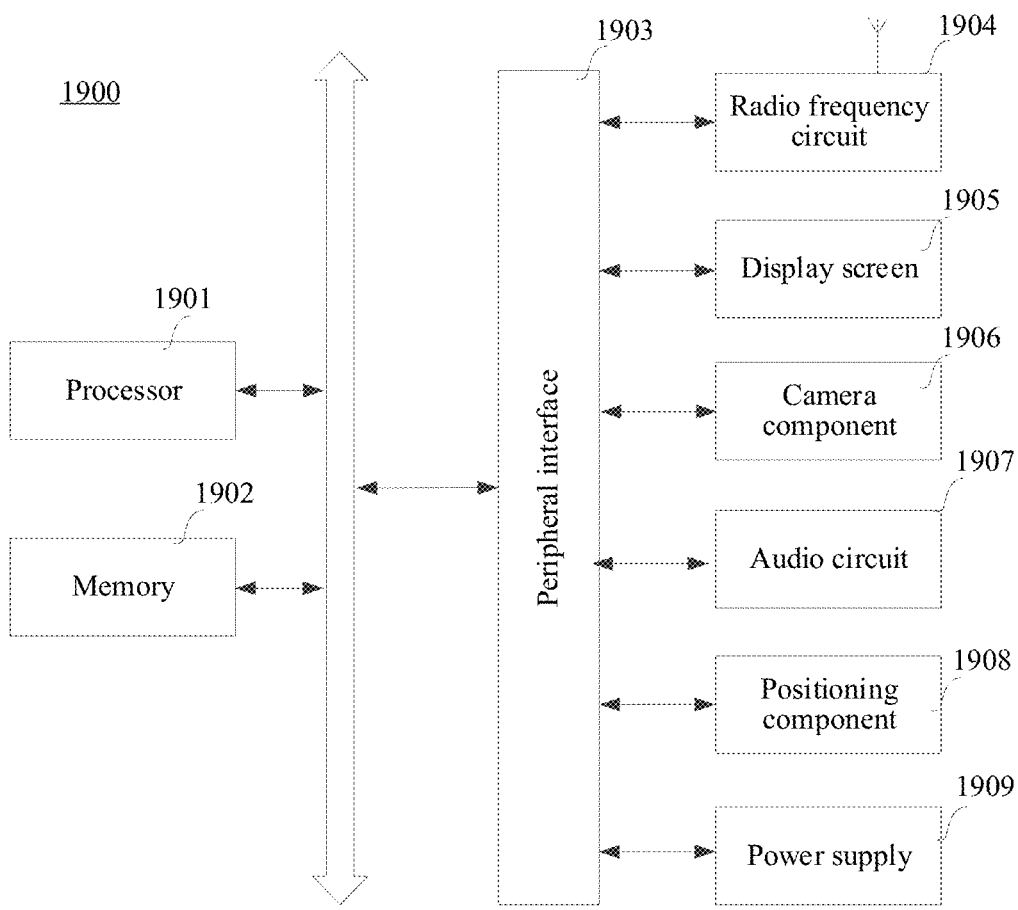
FIG. 19 is a schematic structural diagram of a computer device according to an embodiment of this application.

FIG. 19 is a structural block diagram of a computer device 1900 according to an embodiment of this application. The computer device 1900 may be a mobile phone, a tablet computer, a wearable device, a multimedia playback device, a camera, and another electronic device. Different from a quantum computer, the computer device 1900 is also referred to as an electronic computer.

Generally, the computer device 1900 includes a processor 1901 and a memory 1902.

The processor 1901 may include one or more processing cores. For example, the processor may be a 4-core processor or a 19-core processor. The processor 1901 may be implemented by using at least one hardware form of a digital signal processor (DSP), a field programmable gate array (FPGA), and a programmable logic array (PLA). The processor 1901 may alternatively include a main processor and a coprocessor. The main processor is configured to process data in an active state, also referred to as a central processing unit (CPU). The coprocessor is a low-power processor configured to process data in a standby state. In some embodiments, the processor 1901 may be integrated with a graphics processing unit (GPU). The GPU is configured to render and draw content that needs to be displayed on a display screen. In some embodiments, the processor 1901 may further include an AI processor. The AI processor is configured to process computing operations related to machine learning.

The memory 1902 may include one or more computer-readable storage media. The computer-readable storage media may be non-transient. The memory 1902 may further include a high-speed random access memory (RAM) and a nonvolatile memory, for example, one or more disk storage devices or flash storage devices. In some embodiments, a non-transitory computer-readable storage medium in the memory 1902 is configured to store at least one instruction, at least one program, a code set or an instruction set, the at least one instruction, the at least one program, the code set or the instruction set being configured to be executed by the processor 1901 to implement the method for predicting an adiabatic evolution path provided in the method embodiments of this application.

In some embodiments, the computer device 1900 may include: a peripheral interface 1903 and at least one peripheral. The processor 1901, the memory 1902, and the peripheral interface 1903 may be connected by a bus or a signal cable. Each peripheral may be connected to the peripheral interface 1903 by using a bus, a signal cable, or a circuit board. Specifically, the peripheral may include: at least one of a radio frequency (RF) circuit 1904, a touch display screen 1905, a camera component 1906, an audio circuit 1907, a positioning component 1908, and a power supply 1909.

The camera component 1906 is a three-dimensional camera formed by a color camera and a depth camera.

A person skilled in the art may understand that the structure shown in FIG. 19 does not constitute any limitation on the computer device 1900, and the computer device may include more components or fewer components than those shown in the figure, or some components may be combined, or a different component deployment may be used.

In an exemplary embodiment, a computer-readable storage medium is further provided, storing at least one instruction, at least one program, a code set or an instruction set, the at least one instruction, the at least one program, the code set or the instruction set being executed by a processor of a computer device to implement the foregoing method for predicting an adiabatic evolution path.

In an exemplary embodiment, a computer-readable storage medium is further provided, storing a computer program, the computer program being executed by a processor of a computer device to implement the foregoing method for predicting an adiabatic evolution path.

In some embodiments, the computer-readable storage medium may include a ROM, a RAM, a solid state drive (SSD), an optical disc, or the like. The RAM may include a resistance random access memory (ReRAM) and a dynamic random access memory (DRAM).

In an exemplary embodiment, a computer program product is further provided, the computer program product, when executed by a processor of a computer device, being configured to implement the foregoing method for predicting an adiabatic evolution path.

In an exemplary embodiment, a computer program product is further provided, the computer program product, when executed by a processor of a terminal, being configured to implement the foregoing method for predicting an adiabatic evolution path.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

In some embodiments, the term "solve" (or its equivalents) may be understood as "determine" (or its equivalents). For example, "solving an optimal chessboard path of the chessboard game using a Monte Carlo tree search (MCTS) in combination with a neural network" may be understood as "determining an optimal chessboard path of the chessboard game using a Monte Carlo tree search (MCTS) in combination with a neural network."

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs learning and/or prediction. In practical application, the foregoing functions may be allocated to and completed by different functional modules according to requirements, that is, an inner structure of a device is divided into different functional modules to implement all or a part of the functions described above.

What is claimed is:

1. A method performed at a computer system that includes a computer device and a quantum computer that is different from the computer device and communicatively connected to the computer device, wherein the quantum computer is configured to implement a Grover search for solving an adiabatic quantum computing problem such that a number of times for computing n bits does not exceed $2^{n/2}$, wherein the adiabatic quantum computing problem corresponds to decrypting a password of a computer user account, the method comprising:
at the computer device:
  determining an initial Hamiltonian H0 and a target ground state energy E1 according to a target Hamiltonian H1 associated with the adiabatic quantum computing problem;
  converting a search for an adiabatic evolution path from the initial Hamiltonian H0 to the target ground state energy E1 into a chessboard game;
  associating the chessboard game with a game tree that comprises multiple layers of nodes, wherein a node in a respective layer corresponds to a move position of a respective chessboard piece in the chessboard game for a corresponding respective state of the chessboard game;
  determining a target chessboard path of the chessboard game using a Monte Carlo tree search (MCTS) in combination with a neural network that is trained using reinforcement learning, for reducing a search space of the game tree associated with the chessboard game, the determining including:
    determining, by the neural network, for a current node in a current layer of the game tree, corresponding to a current chessboard piece of the chessboard game for a corresponding to a current state of the chessboard game, candidate move positions and respective probabilities for the candidate move positions for the current state of the chessboard game;
    predicting, using the MCTS in combination with the neural network and in accordance with the respective probabilities, a chessboard path of the chessboard game;
    identifying, by the neural network according to the predicted chessboard path, a subset of nodes for a first subsequent layer of the game tree corresponding to a first subsequent state of the chessboard game, wherein the subset of nodes is less than all the nodes of the first subsequent layer;
    determining, by the neural network for the subset of nodes, candidate move positions and respective probabilities for the candidate move positions for the first subsequent state of the chessboard game;
    repeating the predicting, the identifying and the determining for other subsequent layers of the game tree to obtain an optimized chessboard path;
    determining a predicted adiabatic evolution path according to the optimized chessboard path by mapping the predicted chessboard path to an optimal state vector sequence and obtaining the predicted adiabatic evolution path according to the optimal state vector sequence; and
  transmitting the predicted adiabatic evolution path to the quantum computer;
at the quantum computer:
  implementing the Grover search according to the predicted adiabatic evolution path to evolve the target Hamiltonian H1 from a first quantum state to a second quantum state;
  determining an energy eigenvalue E of the target Hamiltonian H1 when the target Hamiltonian H1 evolves to the second quantum state; and
  transmitting the energy eigenvalue E of the target Hamiltonian H1 to the computer device; and
at the computer device:
  in accordance with a determination that the energy eigenvalue E is less than or equal to the target ground energy state E1:
    determining that a win condition is achieved and a solution to the adiabatic quantum computing problem according to the energy eigenvalue E; and outputting the solution to the adiabatic quantum computing problem, wherein the solution represents the password of the computer user account; and in accordance with a determination that the energy eigenvalue E is greater than the target ground state energy E1:

updating a parameter in the neural network according to the energy eigenvalue E; and repeating the determining the target chessboard path of the chessboard game using the MCTS in combination with the neural network using the updated parameter to update the predicted adiabatic evolution path according to an update to th optimized chessboard path; and causing the quantum computer to perform the aforementioned operations according to the updated predicted adiabatic evolution until the win condition is achieved.

2. The method according to claim 1, wherein:
the neural network comprises a policy network and a value network; and
predicting the chessboard path of the chessboard game further comprises:

searching the game tree corresponding to the chessboard game using the MCTS, to output an action probability distribution π of a node at each layer of the neural network, the action probability distribution π of the node at the layer representing a candidate move position and a probability distribution of a next piece of the chessboard game; and predicting the chessboard path of the chessboard game according to a target move position having a highest action probability distribution π of the node at the layer.

3. The method according to claim 2, wherein the searching a game tree corresponding to the chessboard game by using the MCTS to output an action probability distribution π of a node at each layer comprises:

outputting a candidate move position $a_{i+1}$ and a move probability $p_{i+1}$ of a node $b_{i+1}$ at the $(i+1)^{th}$ layer by using the policy network under a target node bi at the $i^{th}$ layer of the chessboard game, the target node bi at the $i^{th}$ layer corresponding to a target move position of a node at the $i^{th}$ layer, i being an integer not greater than m−1;

expanding the node $b_{i+1}$ at the $(i+1)^{th}$ layer according to the candidate move position $a_{i+1}$, and evaluating the node $b_{i+1}$ at the $(i+1)^{th}$ layer by using the value network, to obtain a value benefit $v_{i+1}$ of each candidate move position $a_{i+1}$;

determining a target node in the node $b_{i+1}$ at the $(i+1)^{th}$ layer with reference to a confidence upper limit U according to the move probability $p_{i+1}$ and the value benefit $v_{i+1}$;

repeating, when the node at the $(i+1)^{th}$ layer is not a node at the $m^{th}$ layer, the foregoing three operations by using the target node at the $(i+1)^{th}$ layer as a new target node of the $i^{th}$ layer; and outputting the action probability distribution π of the node at the when the node at the $(i+1)^{th}$ layer is a node at the $m^{th}$ layer.

4. The method according to claim 3, wherein the confidence upper limit is related to a quantity of times of historical searches of the candidate move position.

5. The method according to claim 2, wherein:
the neural network comprises a policy network and a value network; and
updating a parameter in the neural network according to a current prediction process further comprises:

in accordance with the determination that the energy eigenvalue E does not correspond to the win condition, using the predicted chessboard path as an input of the neural network, to obtain a policy vector p outputted by the policy network and a value benefit v outputted by the value network; and updating the parameter in the neural network so as to maximize a similarity between the policy vector p and the action probability distribution π and minimize an error between the value benefit v and a reward value z for not winning.

6. The method according to claim 1, wherein converting the search for the adiabatic evolution path further comprises:

expressing the adiabatic evolution path from the initial Hamiltonian H0 to the target ground state energy E1 as an adiabatic evolution function s(t);

transforming the adiabatic evolution function s(t) into a state vector sequence b of a frequency domain by using a Fourier transform, the state vector sequence b comprising m vector dimensions, a value range of each vector dimension being 2L; and obtaining the chessboard game through conversion according to a dimension quantity m of the vector dimensions and the value range 2L of the vector dimension, a chessboard corresponding to the chessboard game comprising 2L/Δ rows and m columns, each column corresponding to a move position of a chess, Δ being a discretization step length.

7. A computer system that includes a computer device and a quantum computer that is different from the computer device and communicatively connected to the computer device, wherein the quantum computer is configured to implement a Grover search for solving an adiabatic quantum computing problem such that a number of times for computing n bits does not exceed $2^{n/2}$, wherein the adiabatic quantum computing problem corresponds to decrypting a password of a computer user account, the computer system comprising:

one or more processors; and memory storing one or more programs, that, when executed by the one or more processors, cause the one or more processors to perform operations comprising:

at the computer device:

determining an initial Hamiltonian H0 and a target ground state energy E1 according to a target Hamiltonian H1 associated with the adiabatic quantum computing problem;

converting a search for an adiabatic evolution path from the initial Hamiltonian H0 to the target ground state energy E1 into a chessboard game;

associating the chessboard game with a game tree that comprises multiple layers of nodes, wherein a node in a respective layer corresponds to a move position of a respective chessboard piece in the chessboard game for a corresponding respective state of the chessboard game;

determining a target chessboard path of the chessboard game using a Monte Carlo tree search (MCTS) in combination with a neural network that is trained using reinforcement learning, for reducing a search space of the game tree associated with the chessboard game, the determining including:

determining, by the neural network, for a current node in a current layer of the game tree, corresponding to a current chessboard piece of the chessboard game for a corresponding to a current state of the chessboard game, candidate move positions and respective probabilities for the candidate move positions for the current state of the chessboard game;

predicting, using the MCTS in combination with the neural network and in accordance with the respective probabilities, a chessboard path of the chessboard game;

identifying, by the neural network according to the predicted chessboard path, a subset of nodes for a first subsequent layer of the game tree corresponding to a first subsequent state of the chessboard game, wherein the subset of nodes is less than all the nodes of the first subsequent layer;

determining, by the neural network for the subset of nodes, candidate move positions and respective probabilities for the candidate move positions for the first subsequent state of the chessboard game;

repeating the predicting, the identifying and the determining for other subsequent layers of the game tree to obtain an optimized chessboard path;

determining a predicted adiabatic evolution path according to the optimized chessboard path by mapping the predicted chessboard path to an optimal state vector sequence and obtaining the predicted adiabatic evolution path according to the optimal state vector sequence; and transmitting the predicted adiabatic evolution path to the quantum computer;

at the quantum computer:
implementing the Grover search according to the predicted adiabatic evolution path to evolve the target Hamiltonian H1 from a first quantum state to a second quantum state;

determining an energy eigenvalue E of the target Hamiltonian H1 when the target Hamiltonian H1 evolves to the second quantum state; and transmitting the energy eigenvalue E of the target Hamiltonian H1 to the computer device; and at the computer device:
in accordance with a determination that the energy eigenvalue E is less than or equal to the target ground energy state E1:
determining that a win condition is achieved and a solution to the adiabatic quantum computing problem according to the energy eigenvalue E; and outputting the solution to the adiabatic quantum computing problem, wherein the solution represents the password of the computer user account; and in accordance with a determination that the energy eigenvalue E is greater than the target ground state energy E1:
updating a parameter in the neural network according to the energy eigenvalue E; and repeating the determining the target chessboard path of the chessboard game using the MCTS in combination with the neural network using the updated parameter to update the predicted adiabatic evolution path according to an update to th optimized chessboard path; and causing the quantum computer to perform the aforementioned operations according to the updated predicted adiabatic evolution until the win condition is achieved.

8. The computer system according to claim 7, wherein:
the neural network comprises a policy network and a value network; and predicting the chessboard path of the chessboard game further comprises:
searching the game tree corresponding to the chessboard game using the MCTS, to output an action probability distribution $\pi$ of a node at each layer of the neural network, the action probability distribution $\pi$ of the node at the layer representing a candidate move position and a probability distribution of a next piece of the chessboard game; and predicting the chessboard path of the chessboard game according to a target move position having a highest action probability distribution $\pi$ of the node at the layer.

9. The computer system according to claim 8, wherein the searching a game tree corresponding to the chessboard game by using the MCTS to output an action probability distribution $\pi$ of a node at each layer comprises:

outputting a candidate move position $a_{i+1}$ and a move probability $p_{i+1}$ of a node $b_{i+1}$ at the $(i+1)^{th}$ layer by using the policy network under a target node bi at the $i^{th}$ layer of the chessboard game, the target node bi at the $i^{th}$ layer corresponding to a target move position of a node at the $i^{th}$ layer, i being an integer not greater than m-1;

expanding the node $b_{i+1}$ at the $(i+1)^{th}$ layer according to the candidate move position $a_{i+1}$, and evaluating the node $b_{i+1}$ at the $(i+1)^{th}$ layer by using the value network, to obtain a value benefit $v_{i+1}$ of each candidate move position $a_{i+1}$;

determining a target node in the node $b_{i+1}$ at the $(i+1)^{th}$ layer with reference to a confidence upper limit U according to the move probability $p_{i+1}$ and the value benefit $v_{i+1}$;

repeating, when the node at the $(i+1)^{th}$ layer is not a node at the $m^{th}$ layer, the foregoing three operations by using the target node at the $(i+1)^{th}$ layer as a new target node of the $i^{th}$ layer; and outputting the action probability distribution $\pi$ of the node at the when the node at the $(i+1)^{th}$ layer is a node at the $m^{th}$ layer.

10. The computer system according to claim 9, wherein the confidence upper limit is related to a quantity of times of historical searches of the candidate move position.

11. The computer system according to claim 8, wherein:
the neural network comprises a policy network and a value network; and updating a parameter in the neural network according to a current prediction process further comprises:
in accordance with the determination that the energy eigenvalue E does not correspond to the win condition, using the predicted chessboard path as an input of the neural network, to obtain a policy vector p outputted by the policy network and a value benefit v outputted by the value network; and updating the parameter in the neural network so as to maximize a similarity between the policy vector p and the action probability distribution $\pi$ and minimize an error between the value benefit v and a reward value z for not winning.

12. The computer system according to claim 7, wherein converting the search for the adiabatic evolution path further comprises:
- expressing the adiabatic evolution path from the initial Hamiltonian H0 to the target ground state energy E1 as an adiabatic evolution function s(t);
- transforming the adiabatic evolution function s(t) into a state vector sequence b of a frequency domain by using a Fourier transform, the state vector sequence b comprising m vector dimensions, a value range of each vector dimension being 2L; and
- obtaining the chessboard game through conversion according to a dimension quantity m of the vector dimensions and the value range 2L of the vector dimension, a chessboard corresponding to the chessboard game comprising $2L/\Delta$ rows and m columns, each column corresponding to a move position of a chess, $\Delta$ being a discretization step length.

13. A non-transitory computer readable storage medium storing instructions that, when executed by one or more processors of a computer system that includes a computer device and a quantum computer that is different from the computer device and communicatively connected to the computer device, wherein the quantum computer is configured to a Grover search for solving an adiabatic quantum computing problem such that a number of times for computing n bits does not exceed $2^{n/2}$, wherein the adiabatic quantum computing problem corresponds to decrypting a password of a computer user account, cause the one or more processors to perform operations comprising:
- at the computer device:
    - determining an initial Hamiltonian H0 and a target ground state energy E1 according to a target Hamiltonian H1 associated with the adiabatic quantum computing problem;
    - converting a search for an adiabatic evolution path from the initial Hamiltonian H0 to the target ground state energy E1 into a chessboard game;
    - associating the chessboard game with a game tree that comprises multiple layers of nodes, wherein a node in a respective layer corresponds to a move position of a respective chessboard piece in the chessboard game for a corresponding respective state of the chessboard game;
    - determining a target chessboard path of the chessboard game using a Monte Carlo tree search (MCTS) in combination with a neural network that is trained using reinforcement learning, for reducing a search space of the game tree associated with the chessboard game, the determining including:
        - determining, by the neural network, for a current node in a current layer of the game tree, corresponding to a current chessboard piece of the chessboard game for a corresponding to a current state of the chessboard game, candidate move positions and respective probabilities for the candidate move positions for the current state of the chessboard game;
        - predicting, using the MCTS in combination with the neural network and in accordance with the respective probabilities, a chessboard path of the chessboard game;
        - identifying, by the neural network according to the predicted chessboard path, a subset of nodes for a first subsequent layer of the game tree corresponding to a first subsequent state of the chessboard game, wherein the subset of nodes is less than all the nodes of the first subsequent layer;
        - determining, by the neural network for the subset of nodes, candidate move positions and respective probabilities for the candidate move positions for the first subsequent state of the chessboard game;
        - repeating the predicting, the identifying and the determining for other subsequent layers of the game tree to obtain an optimized chessboard path;
    - determining a predicted adiabatic evolution path according to the optimized chessboard path by mapping the predicted chessboard path to an optimal state vector sequence and obtaining the predicted adiabatic evolution path according to the optimal state vector sequence; and
    - transmitting the predicted adiabatic evolution path to the quantum computer;
- at the quantum computer:
    - implementing the Grover search according to the predicted adiabatic evolution path to evolve the target Hamiltonian H1 from a first quantum state to a second quantum state;
    - determining an energy eigenvalue E of the target Hamiltonian H1 when the target Hamiltonian H1 evolves to the second quantum state; and
    - transmitting the energy eigenvalue E of the target Hamiltonian H1 to the computer device; and
- at the computer device:
    - in accordance with a determination that the energy eigenvalue E is less than or equal to the target ground energy state E1:
        - determining that a win condition is achieved and a solution to the adiabatic quantum computing problem according to the energy eigenvalue E; and
        - outputting the solution to the adiabatic quantum computing problem, wherein the solution represents the password of the computer user account; and
    - in accordance with a determination that the energy eigenvalue E is greater than the target ground state energy E1:
        - updating a parameter in the neural network according to the energy eigenvalue E; and
        - repeating the determining the target chessboard path of the chessboard game using the MCTS in combination with the neural network using the updated parameter to update the predicted adiabatic evolution path according to an update to th optimized chessboard path; and
        - causing the quantum computer to perform the aforementioned operations according to the updated predicted adiabatic evolution until the win condition is achieved.

14. The non-transitory computer readable storage medium according to claim 13, wherein:
- the neural network comprises a policy network and a value network; and
- predicting the chessboard path of the chessboard game further comprises:
    - searching the game tree corresponding to the chessboard game using the MCTS, to output an action probability distribution $\pi$ of a node at each layer of the neural network, the action probability distribution $\pi$ of the node at the layer representing a candidate move position and a probability distribution of a next piece of the chessboard game; and predicting the chessboard path of the chessboard game according to a target move position having a highest action probability distribution $\pi$ of the node at the layer.

15. The non-transitory computer readable storage medium according to claim 14, wherein the searching a game tree corresponding to the chessboard game by using the MCTS to output an action probability distribution $\pi$ of a node at each layer comprises:

outputting a candidate move position $a_{i+1}$ and a move probability $p_{i+1}$ of a node $b_{i+1}$ at the $(i+1)^{th}$ layer by using the policy network under a target node bi at the $i^{th}$ layer of the chessboard game, the target node bi at the $i^{th}$ layer corresponding to a target move position of a node at the $i^{th}$ layer, i being an integer not greater than m−1;

expanding the node $b_{i+1}$ at the $(i+1)^{th}$ layer according to the candidate move position $a_{i+1}$, and evaluating the node $b_{i+1}$ at the $(i+1)^{th}$ layer by using the value network, to obtain a value benefit $v_{i+1}$ of each candidate move position $a_{i+1}$;

determining a target node in the node $b_{i+1}$ at the $(i+1)^{th}$ layer with reference to a confidence upper limit U according to the move probability $p_{i+1}$ and the value benefit $v_{i+1}$;

repeating, when the node at the $(i+1)^{th}$ layer is not a node at the $m^{th}$ layer, the foregoing three operations by using the target node at the $(i+1)^{th}$ layer as a new target node of the $i^{th}$ layer; and outputting the action probability distribution n of the node when the node at the $(i+1)^{th}$ layer is a node at the $m^{th}$ layer.

16. The non-transitory computer readable storage medium according to claim 15, wherein the confidence upper limit is related to a quantity of times of historical searches of the candidate move position.

17. The non-transitory computer readable storage medium according to claim 14, wherein:

the neural network comprises a policy network and a value network; and updating a parameter in the neural network according to a current prediction process further comprises:

in accordance with the determination that the energy eigenvalue E does not correspond to the win condition, using the predicted chessboard path as an input of the neural network, to obtain a policy vector p outputted by the policy network and a value benefit v outputted by the value network; and updating the parameter in the neural network so as to maximize a similarity between the policy vector p and the action probability distribution $\pi$ and minimize an error between the value benefit v and a reward value z for not winning.

* * * * *